May 7, 1968  W. F. HUCK  3,381,912
CORE LOCKUP AND SIDELAY CONTROL DEVICE FOR SPLICING ROLLSTANDS
Filed Nov. 26, 1965  6 Sheets-Sheet 1

INVENTOR.
WILLIAM F. HUCK
BY
Albert C. Johnston
ATTORNEY

INVENTOR.
WILLIAM F. HUCK
BY
Albert C. Johnston
ATTORNEY

May 7, 1968 W. F. HUCK 3,381,912
CORE LOCKUP AND SIDELAY CONTROL DEVICE FOR SPLICING ROLLSTANDS
Filed Nov. 26, 1965 6 Sheets-Sheet 3
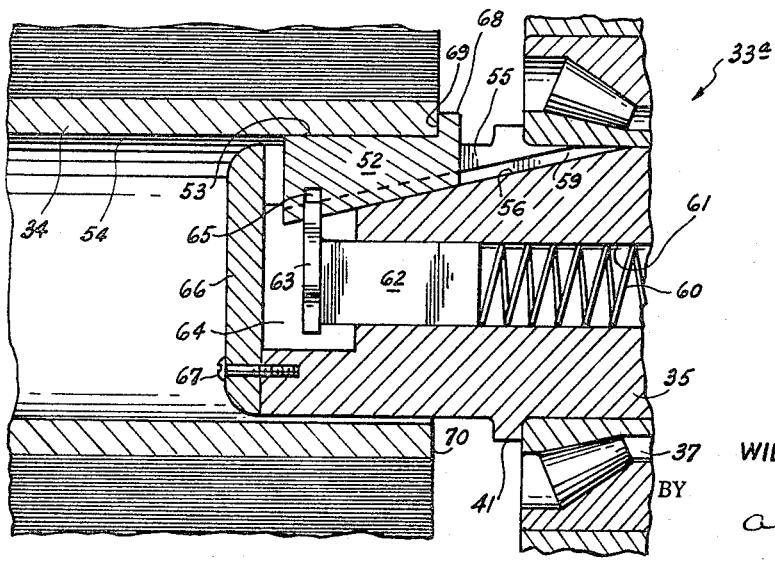
INVENTOR.
WILLIAM F. HUCK
BY
ATTORNEY May 7, 1968 W. F. HUCK 3,381,912
CORE LOCKUP AND SIDELAY CONTROL DEVICE FOR SPLICING ROLLSTANDS
Filed Nov. 26, 1965 6 Sheets-Sheet 4
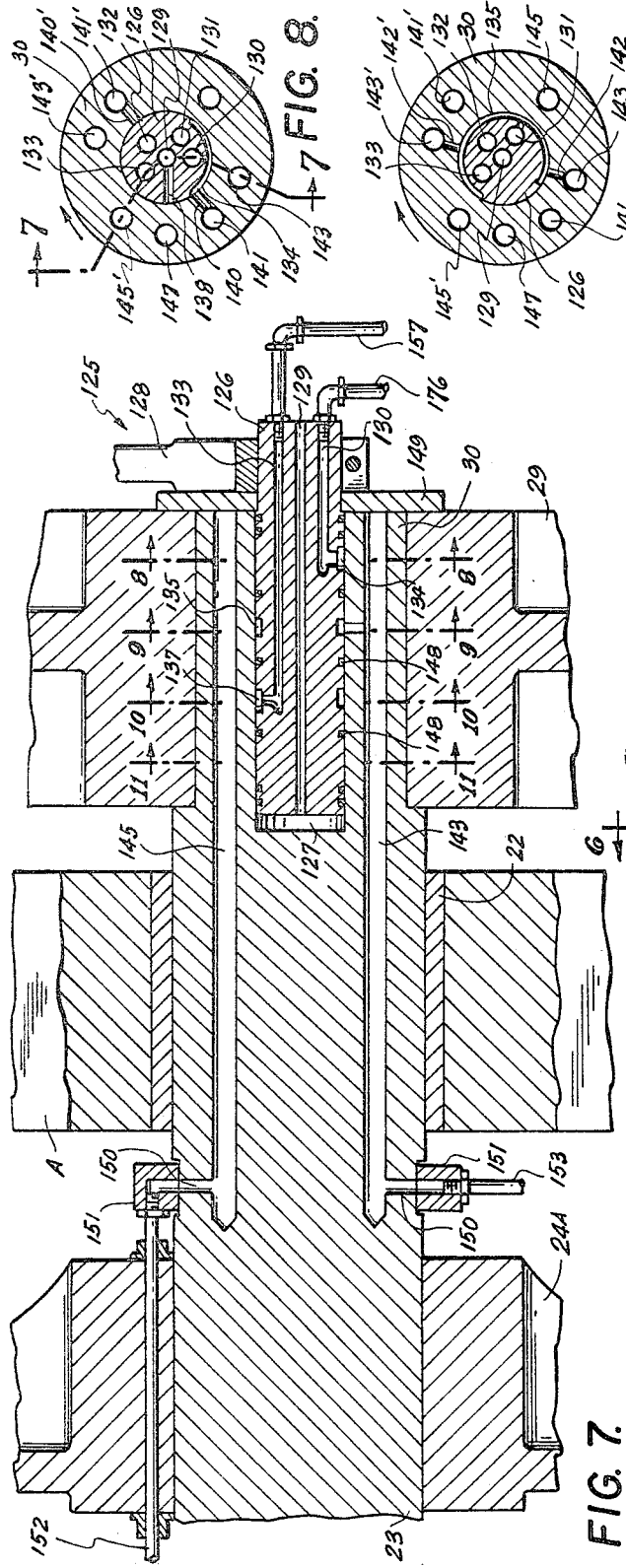
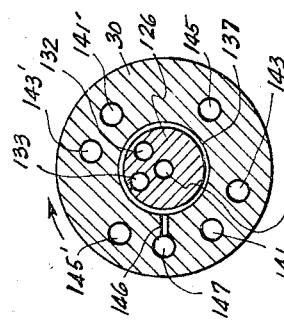
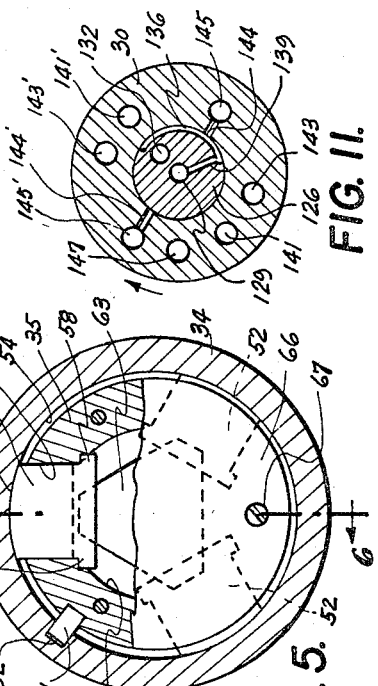
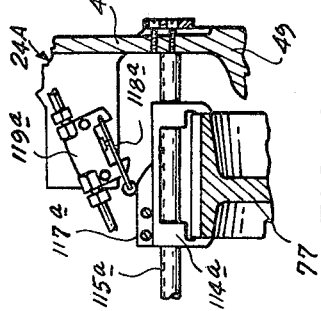
INVENTOR.
WILLIAM F. HUCK
BY
*Allen C. Johnston*
ATTORNEY May 7, 1968

W. F. HUCK 3,381,912

CORE LOCKUP AND SIDELAY CONTROL DEVICE FOR SPLICING ROLLSTANDS

Filed Nov. 26, 1965

INVENTOR.
WILLIAM F. HUCK
BY
Albert C. Johnston
ATTORNEY

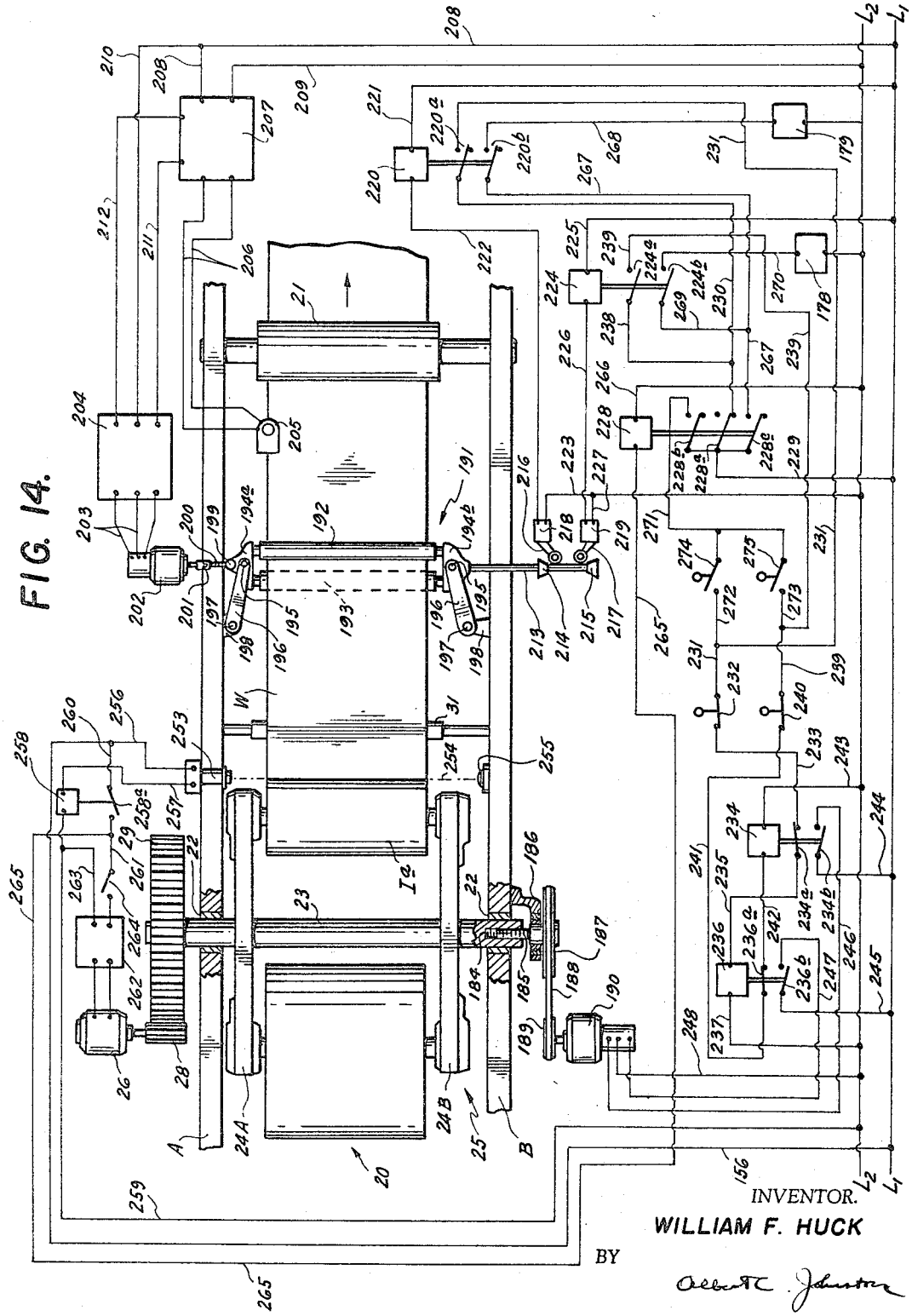

United States Patent Office 3,381,912
Patented May 7, 1968

3,381,912
CORE LOCKUP AND SIDELAY CONTROL
DEVICE FOR SPLICING ROLLSTANDS
William F. Huck, 81 Greenway Terrace,
Forest Hills, N.Y. 11375
Filed Nov. 26, 1965, Ser. No. 509,945
31 Claims. (Cl. 242—58.1)

ABSTRACT OF THE DISCLOSURE

A rollstand has parallel arms carrying freely rotatable shafts which are displaceable axially to move end portions thereof having locking segments slidably mounted thereupon into the ends of a web roll core and force the segments radially into tight clamping and roll-supporting engagement with the core, whereupon further axial displacement of the shafts will adjust the sidelay of the roll. In a web-splicing rollstand utilizing this core lock-up structure, arms carrying both running and replacement rolls are also displaceable axially as a unit to adjust the sidelay of the running web.

---

This invention relates generally to rollstands in which a web is delivered or unwound from a web supply roll to a printing press or other web processing machine.

In existing rollstands for delivering web material from a roll thereof wound on an open-ended core, the chuck assemblies for releasably supporting the roll core at the ends thereof usually include cone-shaped heads adapted to extend axially into the open ends of the core for engagement with the inner surface of the core at such ends. The cone-shaped heads are on spindles or shafts rotatable in suitable bearings mounted in housings that are axially movable by manual actuation for displacing the cone-shaped heads axially into and out of engagement with the roll core.

Although the cone-shaped heads of the existing chuck assemblies can accommodate variations in the diameter of the roll core, such heads have only line contact or, at best, a very limited area of contact with the core for supporting the weight of the web roll. Further, it has been necessary to apply great axial forces to the heads for ensuring the proper engagement thereof with the roll core. If the cone-shaped heads are not firmly engaged with the roll core, the weight of the roll causes excessive wear at the contacting surfaces of the heads and the core, and such wear results in roll looseness and axial wandering of the roll during the delivery of the web therefrom. Axial wandering of the roll in the rollstand during delivery of the web from the roll makes it difficult to maintain the desired sidelay or lateral registration of the web with respect to the printing press or other web processing machine and may also result in whip of the web with possible damage to the web. As the size and weight of web supply rolls have increased, the difficulty of securely holding such rolls by manually actuated chuck assemblies has also increased.

Further, the penetration of the cone-shaped heads into the core ends of a new roll varies in accordance with the core diameter and the condition of the contacting surfaces of the core and of the cone-shaped heads and results in uncertain sidelay of the web roll. In splicing rollstands for continuously delivering web material from one web supply roll after another, uncertain sidelay of the new roll and failure of the operator to laterally align or register the new web roll with the web being delivered from the expiring web roll, can cause the web being delivered or unwound from the expiring roll to be spliced to the leading end of the web forming the new roll in a laterally offset position. Such a laterally offset splice results in waste of the web material or even in web breaks which cause costly delays or shut-downs in the operation of the printing press or other web processing machine. In existing splicing rollstands, efforts to laterally align the new web supply roll with the web being delivered from an expiring roll prior to the splicing thereof have involved axial shifting of the new web supply roll relative to the reel arms of the rollstand. However, by reason of the great weight of the new web supply roll, it is difficult to achieve accurate and sensitive sidelay or lateral register control by axial displacement of the new roll relative to the reel arms.

Accordingly, it is an object of this invention to provide a rollstand having chuck assemblies for rotatably supporting a roll of web material wound on an open-ended core, wherein such chuck assemblies are securely engageable with relatively large areas of the inner surface of the roll core adjacent the ends of the latter irrespective of variations in the core diameter, thereby to support web rolls of great weight without excessive wear of the contacting surfaces of the chuck assemblies and roll core.

In accordance with an aspect of this invention, at least one of the chuck assemblies carried by the spaced apart support members of a rollstand for rotatably supporting a roll of web material wound on an open-ended core comprises a shaft mounted for rotation and for axial movement to move a projecting end portion into an adjacent end of the roll core, and locking segments on the projecting end portion of the shaft presenting outer surfaces to be seated against the inner surface of the core end, the locking segments and the projecting end portion of the shaft having co-engaging surfaces at least some of which are inclined with respect to the axis of the shaft and operative to expand the segments radially into clamping engagement with the inner surface of the core in response to movement of the projecting end portion of the shaft axially into the core end and relative to the segments.

In a chuck assembly in accordance with a preferred embodiment of the invention, the locking segments have abutment surfaces thereon extending radially beyond the outer surfaces of the segments to bear axially against an end face of the roll core and hold the segments at definite axial locations in the core end as the projecting end portion of the shaft is moved into the core end, and the segments are spring urged axially relative to the projecting end portion of the shaft in the direction for retracting the segments radially, thereby to free the segments from the inner surface of the core in response to movement of the end portion of the shaft axially out of the core end.

In accordance with another feature of this invention, each of the chuck assemblies for rotatably supporting a roll of web material wound on an open-ended core between the support members of a rollstand comprises a shaft and locking segments as described above, and reversible power operated means acting on the shaft of the respective chuck assembly to move such shaft axially relative to the support members so that, after the locking segments of both chuck assemblies have been expanded radially into clamping engagement with the inner surface of the roll core adjacent the ends of the latter, the shafts of both chuck assemblies can be moved axially in the same direction for axially displacing the supported roll relative to the support members, for example, in controlling the sidelay or lateral register of the web being unwound from the roll relative to the printing press.

Another object of the invention is to provide a rollstand in which a new web roll, when securely supported therein by the chuck assemblies, has its sidelay or lateral position accurately and automatically predetermined irrespective of variations in the diameter of the roll core or of the condition of the contacting surfaces of the roll core and chuck assemblies, thereby to ensure that the web material unwound from the new web roll is in correct lateral register with respect to the printing press or other web processing machine to which the web material is delivered.

A further object is to provide a splicing rollstand for delivering a web continuously from one web supply roll after another to a printing press or other web processing machine, in which accurate lateral register of the unwinding web relative to the web processing machine is maintained at all times and the splicing of the web being unwound from an expiring roll to the periphery of a new web supply roll is effected with the unwinding web and the new roll in substantial lateral alignment.

In accordance with another aspect of this invention, a splicing rollstand for delivering a web continuously from one web supply roll after another to a web processing machine has support means, for example in the form of reel arms, for carrying a web roll from which a web is being unwound and a new web roll to the periphery of which the unwinding web is to be spliced, such support means being mounted for an indexing movement to dispose the new roll in a splicing position and simultaneously to move the unwinding roll from a running position to an expiring position, and the sidelay or lateral position of the unwinding web is controlled by displacing the support means or reel arms in directions axially of the rolls when the unwinding roll is in the running position and, alternatively, by displacing the unwinding roll axially relative to the reel arms when the unwinding roll is in the expiring position.

In accordance with another feature of this invention, a splicing rollstand of the described character ensures that the web unwound from the new web supply roll following the splicing operation will be laterally registered with respect to the web processing machine by automatically establishing a predetermined axial location of the new web roll between the reel arms when the core of the new roll is locked-up or clamped by the respective chuck assemblies, and by returning the reel arms to a normal or predetermined axial position thereof in the event that the reel arms are disposed away from such normal position when indexed to dispose the new roll at the splicing position.

Still another object of the invention is to provide a splicing rollstand in which indexing of the reel arms for moving a new web supply roll from loading position to splicing position is prevented when the new roll is inadequately clamped by the chuck assemblies, thereby to avoid the consequences of the unwinding of web material from a loosely supported roll.

The above, and other objects, features and advantages of the invention, will be apparent in the following detailed description of an illustrative embodiment thereof which is to be read in connection with the accompanying drawings, wherein:

FIG. 3 is a side elevational view of one of the chuck assemblies, as viewed in the direction of the arrows 3—3 on FIG. 2, but with a cover being removed from the related reel arm;

FIG. 4 is a fragmentary sectional view taken along the line 4—4 on FIG. 3;

FIG. 5 is an enlarged fragmentary sectional view taken along the line 5—5 on FIG. 2;

FIG. 6 is a sectional view taken along the line 6—6 on FIG. 5;

FIG. 7 is an enlarged, axial sectional view of an end portion of the main shaft included in the rollstand shown on FIG. 1, and which is taken along the line 7—7 on FIG. 8;

Figure 1:
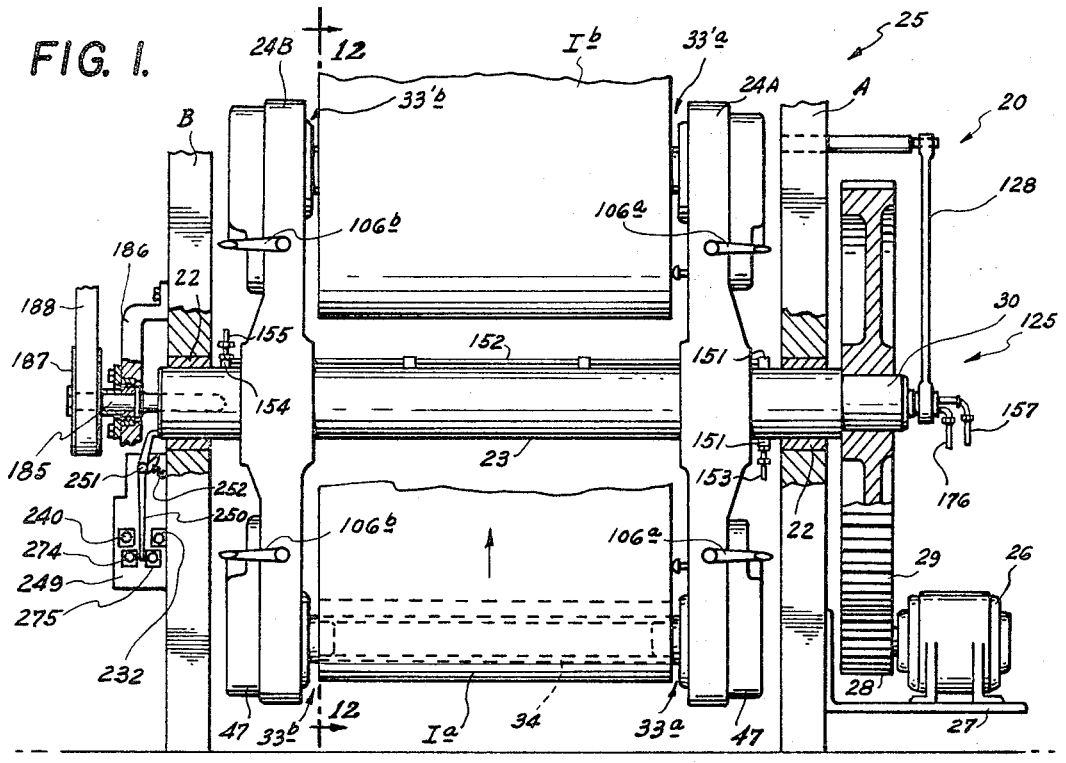
FIG. 1 is a front elevational view, partly broken away and in section, of a rollstand embodying this invention.
Figure 12:
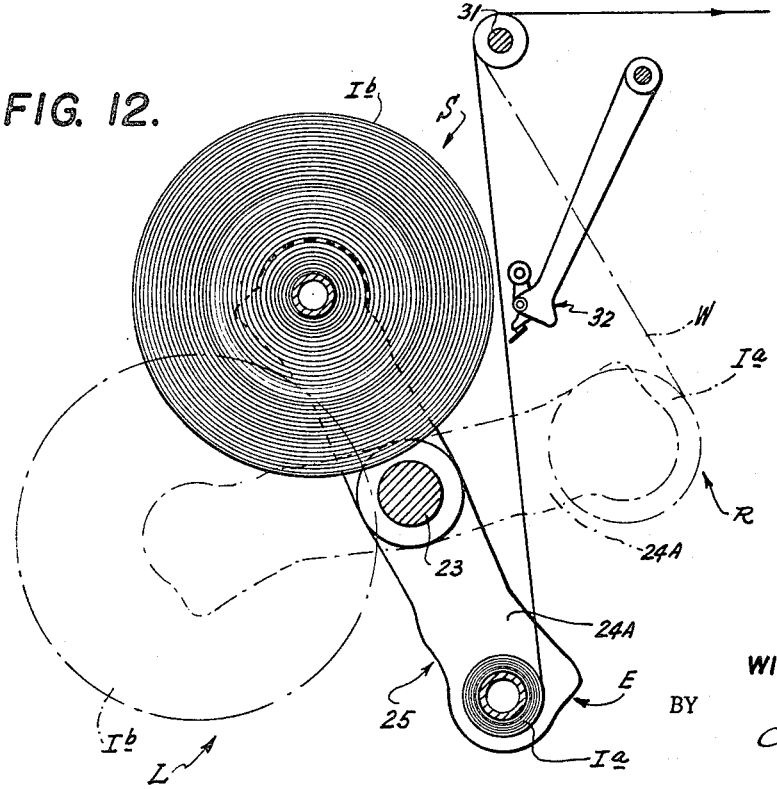
Figure 13:
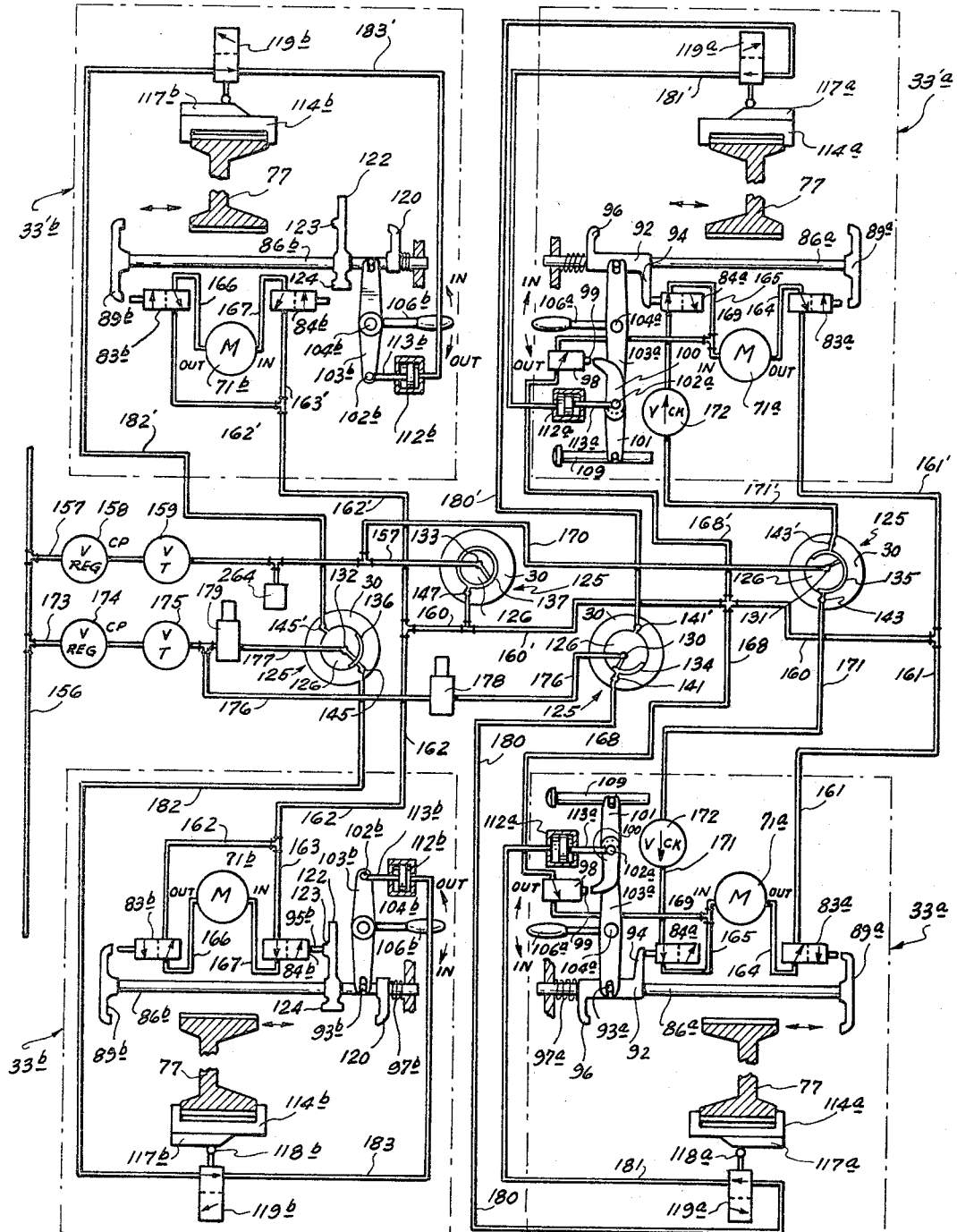

FIGS. 8, 9, 10 and 11 are sectional views taken along the lines 8—8, 9—9, 10—10 and 11—11 respectively, on FIG. 7 to show details of a rotary valve assembly included in the end portion of the main shaft;

FIG. 12 is a diagrammatic sectional view taken along the line 12—12 on FIG. 1 and showing the reel of the rollstand in two different operating positions;

FIG. 13 is a diagrammatic view illustrating the pneumatic control system of the rollstand embodying this invention; and FIG. 14 is a diagrammatic view illustrating the electrical control system of the rollstand.

Referring to the drawings in detail, it will be seen that considerable simplification has been effected in the several views of the drawings in order not to obscure the novel features characteristic of the invention with details of conventional parts well known to those skilled in the art. Also, where possible, conventional symbols have been used to represent known components.

In the drawings, the invention has been shown applied to a rollstand 20 (FIG. 1) which is of the splicing type, that is, a rollstand capable of continuously delivering web material from one web supply roll after another, for example, to a printing press or other web processing machine having web processing cylinders, as indicated schematically at 21 on FIG. 13.

The rollstand 20 is shown to include vertical side frame members A and B carrying bearings 22 (FIG. 1) in which the opposite end portions of a rotatable and axially movable horizontal main shaft or spindle 23 are slidably journaled. The successive web supply rolls from which web material is to be continuously delivered are rotatably supported between the ends of a pair of reel arms 24A and 24B which are mounted, at their centers, on spindle 23 and which, together with the spindle, constitute a reel assembly 25. Indexing movement of reel assembly 25, that is, rotation of the latter about the axis of main shaft or spindle 23, is effected by a motor 26 which is mounted on a bracket 27 extending from side frame member A and which has a pinion 28 secured on the motor shaft and meshing with a gear 29 secured on an end portion 30 of spindle 23 projecting beyond side frame member A.

During normal running of rollstand 20, reel arms 24A and 24B are disposed in the position shown in broken lines on FIG. 12 and the web W is unwound from a web supply roll Ia positioned at a normal running position R by the related ends of the reel arms. The web W unwound from web supply roll Ia travels upwardly therefrom and then around a roller 31 journaled in side frame members A and B in the course of the travel of the unwinding web to the rotated web processing cylinders 21. When the unwinding web roll Ia is held between the ends of reel arms 24A and 24B disposed at normal running position R, the opposite ends of the reel arms are disposed at a loading position L (FIG. 12) to receive a new web supply roll Ib therebetween. After a substantial proportion of the web on roll Ia at normal running position R has been unwound therefrom, motor 26 is energized, as hereinafter described, to effect rotation of reel arms 24A and 24B in the clockwise direction, as viewed on FIG. 12. Such angular displacement or indexing movement of reel 25 moves the new web supply roll Ib toward a splicing position S and simultaneously moves the expiring web roll Ia toward an expiring position E, as shown in full lines on FIG. 12. It will be apparent that the run of web W being unwound from roll Ia and which is guided by idler roller 31 extends across the path of travel of the new web roll moving toward splicing position S. Thus, when new web roll Ib reaches splicing position S, the periphery of that roll is adjacent to the run of web W extended from expiring web roll Ia.

Upon movement of a new web roll to splicing position S, a splicing assembly 32 (FIG. 12) is moved to the position shown on the drawing so as to be operable on the run of web W extending from expiring roll Ia at the side of such web run facing away from the new web roll. The splicing assembly 32, which forms no part of the present invention, may be of the type disclosed in detail in my copending application for U.S. Letters Patent, Ser. No. 470,672, filed July 9, 1965, for "Positioning Controls for Splicing Rollstands." Such splicing assembly is operative, after new web roll Ib at splicing position S has been suitably accelerated up to a peripheral speed that substantially matches the speed of movement of web W being unwound from expiring roll Ia, to press the expiring web run against adhesive previously applied to the periphery of the new web roll and thereby join or splice the web from the expiring roll Ia to the web of the new roll. Immediately after such splicing of the expiring web to the periphery of the new web roll, splicing assembly 32 further acts to sever the expiring web run in back of the splice, that is, at a location between the splice and the expiring roll Ia, whereupon, the delivery of web material to the web processing machine continues without interruption from the new web supply roll. After the foregoing web splicing and severing operations, reel 25 is again indexed or turned to dispose the new web roll at normal running position R and simultaneously to dispose the expired roll at loading position L where the expired roll can be removed from between the reel arms and replaced by the next new web supply roll.

In order to rotatably support the successive web supply rolls between the ends of reel arms 24A and 24B, the opposite ends of reel arm 14A carry identical right-hand chuck assemblies 33a and 33'a and the opposite ends of reel arm 24B carry identical left-hand chuck assemblies 33b and 33'b that are generally similar to the assemblies 33a and 33'a. Thus, chuck assemblies 33a and 33b cooperate to rotatably support a web supply roll, for example, the roll Ia as shown, between the related ends of reel arms 24A and 24B, and chuck assemblies 33'a and 33'b cooperate to support another web supply roll, for example, the roll Ib, between the other ends of the reel arms.

Figure 2:
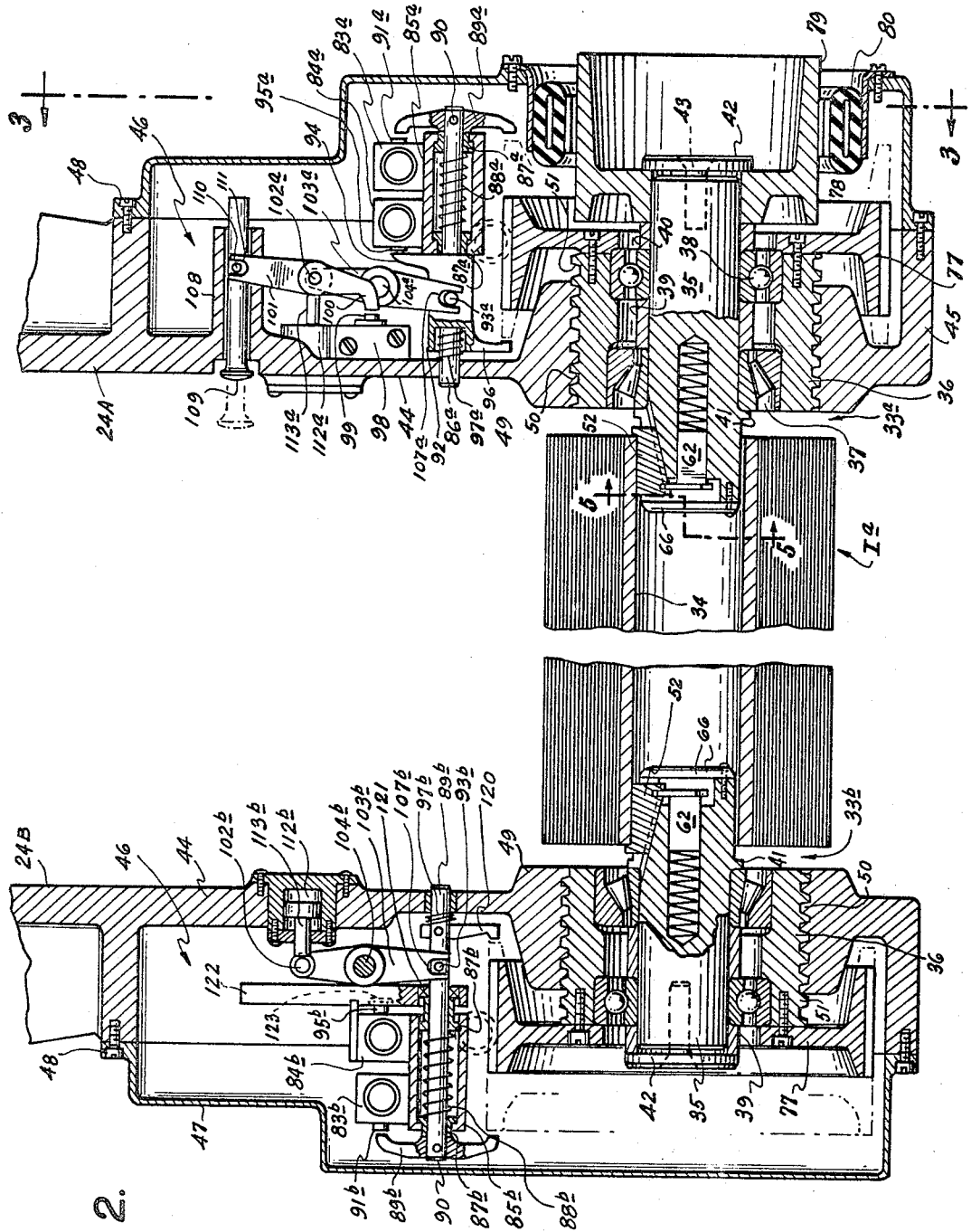
FIG. 2 is an enlarged sectional view taken in a vertical plane through the axis of the lower web supply roll supported in the rollstand of FIG. 1, and showing details of the chuck assemblies by which such roll is rotatably mounted.

As shown particularly on FIG. 2, each roll of web material for use in the rollstand embodying this invention is wound on an open-ended core 34 which may be cylindrical, as shown, and which is engageable at its ends, by a pair of the chuck assemblies.

In accordance with this invention, each of the chuck assemblies comprises a shaft 35 rotatably mounted within a generally cylindrical bearing housing 36 by bearings 37 and 38. Bearings 37 and 38 are spaced apart along shaft 35 by spacers 39 and 40, and are held against axial displacement relative to the shaft by a flange 41 spaced axially from the inner end of shaft 35 and by a retaining disk 42 secured to the outer end of the shaft, as by a screw 43. Thus, shaft 35 is held against axial displacement relative to bearing housing 36 while being free to rotate with respect to the latter, and the inner end portion of shaft 35 projects axially out of housing 36.

Each of reel arms 24A and 24B has an inner wall 44 from which a flange 45 extends outwardly at each end of the reel arm to define a casing 46 for the respective chuck assembly, and such casing 46 is normally closed by a cover 47 removably secured at its perimeter to flange 45, as by screws 48. Within each casing 46, inner wall 44 is formed with a hollow boss 49 having internal threads 50 engaged by corresponding external threads 51 on bearing housing 36 of the related chuck assembly. By reason of the interengaging threads 50 and 51, rotation of bearing housing 36 effects axial displacement of the bearing housing and shaft 35 with respect to the related reel arm, thereby to move the projecting inner end portion of the shaft axially into or out of the adjacent open end of roll core 34.

As shown particularly on FIGS. 5 and 6, the projecting inner end portion of shaft 35 carries locking segments 52 presenting outer surfaces 53 to be seated against the inner surface 54 of roll core 34 adjacent the end of the core into which the projecting end portion of shaft 35 is axially inserted. In the illustrated embodiment of the invention, there are three locking segments 52 spaced apart equally around shaft 35, and their outer surfaces 53 constitute segments of a cylindrical surface so as to conform to the cylindrical configuration of the inner surface 43 of core 34. Locking segments 52 and the projecting inner end portion of shaft 35 have co-engaging surfaces at least some of which are inclined with respect to the axis of shaft 35 so as to expand segments 52 radially into clamping engagement with inner surface 54 of core 34 in response to movement of the projecting end portion of the shaft axially into the core and relative to segments 52.

More particularly, as shown, each locking segment 52 is slidable longitudinally in a corresponding groove 55 formed in shaft 35 and which opens radially outward and axially at the inner end of the shaft. As shown on FIG. 6, the bottom surface 56 of each groove 55 and the bottom or radially inner surface 57 of the corresponding locking segment 52 which engages the surface 56 are inclined with respect to the axis of shaft 35, that is, converge with respect to the axis of the shaft in the direction toward the inner end of the shaft. Thus, when shaft 35 moves toward the left, as viewed on FIG. 6, that is, in the direction into the adjacent end of core 34, relative to locking segments 52, such locking segments are radially expanded into clamping engagement with the inner surface 54 of the core. Conversely, when shaft 35 is moved axially relative to locking segments 52 in the direction out of core 34, that is, toward the right as viewed on FIG. 6, locking segments 52 are radially contracted to release their outer surfaces 53 from the inner core surface 54.

In order to hold locking segments 52 within the related grooves 55, each locking segment 52 may be formed with lateral tongues 58 (FIG. 5) engaging in corresponding undercut portions 59 at the opposite sides of the related groove 55 (FIG. 6).

Locking segments 52 are urged axially toward the inner end of shaft 35, that is, in the direction for radially contracting the locking segments, by means of a helical compression spring 60 disposed in an axial socket 61 formed in shaft 35 and slidably receiving a plunger 62 which is urged axially toward the inner end of shaft 35 by spring 60. Plunger 62 has a head 63 movable axially in a recess 64 at the inner end of shaft 35 and into which axial socket 61 opens. Head 63 may be of generally triangular configuration, as shown on FIG. 5, and has each of its corner portions received in a slot 65 (FIG. 6) extending laterally across bottom surface 57 of a related one of the locking segments 52 adjacent the axially inner end of the latter. Thus, spring 60 acts through plunger 62 and the head 63 of the latter engaged in the slots 65 of locking segments 52 to urge the locking segments axially toward the inner end of shaft 35.

The axial movement of locking segments 52 under the urging of spring 60 is limited by a cap 66 secured on the inner end of shaft 35, as by screws 67, and which is engageable by the inner end faces of the locking segments. When locking segments 52 engage cap 66, the radially outer surfaces 53 of the locking segments are radially retracted so as to be substantially flush with the surface of the inner end portion of shaft 35, thereby to avoid interference with the insertion of the shaft into the adjacent end of core 34.

As shown particularly on FIG. 6, each of locking segments 52 has a radially outward directed flange 68 extending from its axially outer end to define an abutment surface 69 which projects radially beyond outer surface 53 of the locking segment so as to be adapted to bear axially against an end face 70 of roll core 34.

When a web roll is to be engaged by a pair of the chuck assemblies, for example, the chuck assemblies 33a and 33b, for rotatably supporting such web roll between the related ends of reel arms 24A and 24B, bearing housings 36 of the chuck assemblies are initially turned in the direction for moving the related shafts 35 axially outward to positions where the axial distance between the inner ends of the two shafts 35 is greater than the axial dimension of the web roll. After the web roll has been disposed between chuck assemblies 33a and 33b with its axis in substantial alignment with the axes of shafts 35, bearing housings 36 of the chuck assemblies are turned in the direction for moving the shafts 35 axially inward, that is, axially into the adjacent open ends of roll core 34. During initial penetration of the inner end portion of each shaft 35 into the adjacent end of core 34, locking segments 52 are radially retracted and made to rest against cap 66 by the action of spring 60 for axial movement with the shaft. However, upon axial engagement of abutment surfaces 69 of the locking segments with end face 70 of roll core 34, locking segments 52 are held at definite axial locations in the end of core 34, and further axial movement of the inner end portion of shaft 35 into the core causes radial expansion of locking segments 52 and thereby urges the outer surfaces 53 of the locking segments into clamping engagement with inner surface 54 of the roll core. Thus, the axial force exerted on each shaft 35 is translated into a radial, outwardly directed clamping force of the locking segments 52 against the inner surface of core 34. Since the clamping force is exerted over the relatively large area of contact of outer surfaces 53 of the locking segments with inner surface 54 of the roll core, the clamping force can be of large magnitude for securely and tightly holding heavy web rolls on shafts 35 without damage to the contacting surfaces of the locking segments and roll core.

The large forces for lock-up or clamping of roll core 34 on shafts 35 of chuck assemblies 33a and 33b may be conveniently applied by reversible, compressed air or other fluid pressure operated motors 71a and 71b, respectively (FIGS. 3 and 13). As shown particularly on FIG. 3, each of the motors is mounted on a bracket 72 within the related chuck assembly casing 46 and has a motor shaft 73 journaled, at its end, in a bearing 74 carried by a bracket 75. Motor shaft 73 has a worm 76 intermediate its ends which meshes with a worm gear 77 secured, as by screws 78, on the outer end of the related bearing housing 36. Thus, depending on the direction in which fluid under pressure is supplied to motor 71a or 71b, the bearing housing 36 is rotated to move the related shaft 35 in the axial inward or outward direction.

After locking segments 52 have been radially expanded into clamping engagement with inner surface 54 of roll core 34, as described above, the magnitude of the clamping or lock-up forces that are exerted is dependent upon the pressure of the fluid supplied to motors 71a and 71b. If fluid under pressure is supplied to motors 71a and 71b of chuck assemblies 33a and 33b in the direction for moving the respective shafts 35 axially inward after clamping or lock-up has been achieved, the resulting continuously applied clamping forces ensures that the web roll is firmly and securely supported on shafts 35 during the unwinding of the web from the roll. However, even if the supplying of fluid under pressure to motors 71a and 71b is interrupted after lock-up or clamping of the roll core has been achieved, the clamping engagement of locking segments 52 with core 34 will be maintained. This results from the fact that worm 76 and worm gear 77 constitute an irreversible transmission between motor shaft 73 and bearing housing 36 whereby the axial reaction on shaft 35 to the clamping pressure cannot cause turning of motor shaft 73 in the direction for relaxing the clamping pressure.

Release of the roll core is achieved only when fluid under pressure is supplied to motors 71a and 71b in the direction for effecting axially outward movement of shafts 35. During the initial axially outward movement of shafts 35, abutment surfaces 69 of the locking segments are maintained in axial bearing engagement with end faces 70 of core 34 by spring 60 so that locking segments 52 are radially contracted and thereby effect release of their outer surfaces 53 from inner surface 54 of the roll core. Following engagement of locking segments 52 with caps 66 at the inner ends of the shafts, the locking segments move axially outward with shafts 35 and thereby are withdrawn from the ends of the roll core.

Since motors 71a and 71b of chuck assemblies 33a and 33b are reversible, it is possible, after a web roll has been clamped on shafts 35, as described above, to effect axial displacement of the clamped web roll relative to reel arms 24A and 24B. Such axial displacement of the supported web roll relative to the reel arms is simply achieved by supplying fluid under pressure to the motor of one of chuck assemblies 33a and 33b in the direction for effecting axially inward movement of the related shaft 35 while simultaneously supplying fluid under pressure to the motor of the other chuck assembly so as to effect axially outward movement of its shaft 35. It will be apparent that, during such axial displacement of a supported web roll relative to reel arms 24A and 24B, the two shafts 35 move at the same speed so that the clamping forces exerted by the respective locking segments 52 on inner surface 54 of roll core 34 are not relaxed. Therefore, there is no danger that a loose roll condition will occur when axial displacement of the roll relative to the reel arms is effected during unwinding of the web from the roll.

Shaft 35 of one of the chuck assemblies of each pair, for example, the chuck assembly 33a, as shown on FIG. 2, may have a brake drum 79 secured on the outer end portion of the shaft between spacer 40 and retaining disk or washer 42 for engagement by a pneumatically operated brake 80 which is supported from cover 47 and extends around brake drum 79. The pneumatic brake 80 may be operated to frictionally engage drum 79 for maintaining a constant drag on the supported roll during unwinding of the web therefrom, or to stop rotation of the roll when the supply of web material thereon has been exhausted. In order to prevent rotational slipping of the supported roll relative to shaft 35 of chuck assembly 33a when brake 80 is applied, the inner end portion of that shaft 35 may have a key 81 extending therefrom to engage in a mating keyway 82 (FIG. 5) formed in the inner surface 54 of core 34.

In accordance with this invention the pair of chuck assemblies 33a and 33b and the pair of check assemblies 33'a and 33'b of rollstand 20 are controlled so that, when each pair of chuck assemblies is disposed at loading position L and operated to clamp or lock-up a new web supply roll therebetween, such new roll is automatically located at a predetermined lateral or axial position between reel arms 24A and 24B, and, when reel 25 is indexed to move the new roll to splicing positions S, reel 25 is returned to a normal or predetermined axial position thereof in the event that the reel is disposed away from such normal position when indexed, thereby to laterally register the new roll with respect to the desired path of the web through the web processing machine. Further, when each pair of chuck assemblies is at normal running position R, the unwinding roll clamped therebetween is held at the predetermined lateral or axial position between reel arms 24A and 24B, and the desired sidelay or lateral register of the unwinding web with respect to the web processing machine is maintained by axially displacing reel 25 as required. However, when reel 25 is indexed to move the unwinding roll from normal running position R to expiring position E, that is, when a new roll is moved to splicing position, the check assemblies carrying the unwinding roll are controlled to maintain the desired sidelay or lateral register of the unwinding web by effecting axial displacement of the unwinding roll relative to reel arms 24A and 24B, as required.

Referring now to FIGS. 2, 3 and 13, it will be seen that, in the illustrated embodiment of the invention, controlling of the rollstand, as above, is achieved by providing each of right-hand chuck assemblies 33a and 33b with two valves 83a and 84a mounted on a bracket 85a which is suitably secured in the respective casing 46. A control rod 86a is slidably axially in bushings 87a which are carried by bracket 85a and urged against the ends of the latter by an interposed spring 88a. Rod 86a is disposed adjacent the periphery of gear 77 and has its axis extending parallel to the axis of shaft 35. A valve actuating arm 89a is secured, at its center, to the outer ends of rod 86a, as by a pin 90, and its opposite ends constitute fingers respectively extending adjacent an actuator 91a of valve 83a and into the path of axially outward movement of gear 77 with shaft 35. The inner end portion of rod 86a extends beyond bracket 85a and has a valve actuating member 92 secured thereon, as by a pin 93a. Valve actuating member 92 has a finger 94 for engagement with an actuator 95a of valve 84a and also a finger 96 extending into the path of the axially inward movement of the periphery of gear 77 with shaft 35. A compression spring 97a extends around the inner end portion of rod 86a between wall 44 and member 92 and acts to urge rod 86a to a neutral position.

The controls for each right-hand chuck assembly 33a or 33'a also include a valve 98 (FIGS. 2 and 3) mounted on wall 44 and having an actuator 99 which can be depressed by the nose of an actuating lever 100. Lever 100 is secured on a pivot pin 102a which is turnably mounted in one end of a double armed lever 103a. Lever 103a is secured intermediate its ends on the inner end of a shaft 104a rotatable in a bushing 105a (FIG. 3) forming an integral part of casing 46, and a manually actuable operating handle 106a is secured to the outer end of shaft 104a projecting from casing 46. The end of lever 103a remote from pivot pin 102a has a slot 107a (FIG. 2) which receives pin 93a of rod 86a so that the latter is axially displaced in response to rocking of lever 103a by handle 106a. Also secured on pivot pin 102a is a lever 101 which, at its end, extends adjacent a bushing 108 projecting outwardly from wall 44 and slidably receiving a detector rod 109. The detector rod 109 is adapted to project inwardly from arm 24A for engagement with the adjacent end surface of a web roll, as hereinafter described, and rod 109 carries a pin 110 which extends radially through a longitudinal slot (not shown) in bushing 108 and is received in a slot 111 at the end of lever 101. Thus, longitudinal displacement of detector rod 109 can effect rocking of lever 101 and lever 100 about the axis of pivot pin 102a.

Mounted in wall 44 within the casing 46 of chuck assembly 33a is a cylinder 112a (FIGS. 2 and 3) containing a slidable piston from which a piston rod 113a projects outwardly to bear against pivot pin 102a. Thus, when fluid under pressure is supplied to cylinder 112a so as to cause extension or outward movement of piston rod 113a, the latter acts against pivot pin 102a and thereby rocks lever 103a in the clockwise direction, as viewed on FIG. 2, for a purpose hereinafter described in detail.

The controls for each right-hand chuck assembly 33a or 33'a further include a yoke 114a (FIGS. 3 and 4) straddling gear 77 and riding against the flat end faces thereof. Yoke 114a is slidable along a shaft 115a extending parallel to the axis of shaft 35 and supported, at its opposite ends, by wall 44 and cover 47 of casing 46. Suitable means, for example, an interengaging key and keyway 116a (FIG. 3), are provided to hold yoke 114a against turning on shaft 115a. A cam 117a is secured on yoke 115a and is engaged by a cam follower roller carried by an actuator 118a of a limit valve 119a secured within casing 46. Valve 119a is positioned and cam 117a is shaped so that when the related shaft 35 has been moved axially outward to a predetermined position, the roller of actuator 118a rides off cam 117a and thereby causes valve 119a to close for halting operation of the associated motor 71, as hereinafter described in detail.

Referring now to FIGS. 2 and 13, it will be seen that the controls for each of left-hand chuck assemblies 33b and 33'b also include two valves 83b and 84b mounted on a bracket 85b secured in the respective casing 46. A control rod 86b is slidable axially in bushings 87b carried by bracket 85b and urged against the ends of the latter by an interposed spring 88b. A valve actuating arm 89b is secured, at its center, to the outer end of rod 86b, as by a pin 90, and its opposite ends constitute fingers respectively extending adjacent to an actuator 91b of valve 83b and into the path of axially outward movement of the regulated gear 77. The inner end portion of rod 86b extending beyond bracket 85b has a finger 120 secured thereon so as to extend into the path of the axially inward movement of the periphery of the related gear 77. A compression spring 97b extends around rod 86b between wall 44 and finger 120 and acts to urge rod 86b to a neutral position.

Rod 86b further has a bearing 121 (FIG. 2) secured on its inner end portion adjacent bracket 85b and carrying a valve actuating arm 122 which is turnable about the axis of rod 86b and which is formed with a cam surface 123. Arm 122 is weighted, as indicated at 124 on FIG. 13, so that it remains substantially erect at all of the positions chuck assembly 33b can be moved to by indexing movement of reel 25.

A pin 93b extends from rod 86b intermediate arm 122 and finger 120 and engages in a slot 107b provided at one end of a lever 103b. Lever 103b is mounted intermediate its ends on a shaft 104b which is journaled in casing 46 and which extends out of the latter for attachment to a manually actuable handle 106b (FIG. 13). The end of lever 103b remote from slot 107b carries a pin 102b which is engageable by the rod 113b of a piston movable within a cylinder 112b (FIGS. 2 and 13).

As in the case of each right-hand chuck assembly, the controls of each left-hand chuck assembly 33b or 33'b further include a yoke 114b (FIG. 13) straddling the periphery of the related worm gear 77 and being suitably guided for movement axially with the latter, and a cam 117b carried by yoke 114b and being engageable by the roller of an actuator 118b of a limit valve 119b.

The supplying of compressed air or other fluid under pressure to motors 71a and 71b of each pair of chuck assemblies is further controlled by a rotary valve assembly 125 (FIGS. 1 and 7) which determines the mode of operation of the chuck assemblies in dependence on the positions occupied by the latter during indexing of reel 25. As shown particularly on FIG. 7, rotary valve assembly 125 includes a cylindrical core 126 extending axially into a bore 127 formed in end portion 30 of reel spindle 23. Core 126 is held against rotation by an arm 128 (FIGS. 1 and 7) which is clamped on the outer end portion of the core and suitably secured to the adjacent side frame member A. Core 126 has a central vent passage 129 extending axially therealong and opening to the atmosphere at the outer end of the core. Core 126 further has four axial, spaced apart compressed air supply bores 130, 131, 132 and 133 (FIGS. 7 to 11) extending axially for varying distances from the outer end of the core. At axially spaced apart locations on its outer surface, core 126 is formed with grooves 134, 135, 136 and 137 which are of different circumferential extent and connected through radial passages with bores 130, 131, 132 and 133, respectively. Core 126 also has a radial passage 138 (FIG. 8) and a radial passage 139 (FIG. 11) extending radially from the central vent passage 129 and opening at the cylindrical surface of the core at the same axial locations as the grooves 134 and 136, respectively.

As shown on FIG. 8, end portion 30 of the reel spindle has diametrically opposed radial passages 140 and 140' opening from the surface of bore 127 into respective axial passages 141 and 141' and being axially located for selective registration with groove 134 and with radial vent passage 138 of core 126. Groove 134 is circumferentially dimensioned and located to open into radial passage 140 when reel 25 is indexed to move chuck assemblies 33a and 33b to expiring position E, and to open into radial passage 140' when indexing of the reel moves chuck assemblies 33'a and 33'b to the expiring position. Radial vent passage 138 is located to register with radial passage 140 or 140' during indexing of the reel for moving the chuck assemblies 33a and 33b, or the chuck assemblies 33'a and 33'b, respectively, from expiring position E to loading position L.

As shown on FIG. 9, end portion 30 of reel spindle 23 further has diametrically opposed radial passages 142 and 142' opening from the surface of bore 127 into axial passages 143 and 143', respectively. Radial passages 142 and 142' are axially located to register with groove 135 of core 126, and such groove 135 is circumferentially dimensioned and located to communicate with radial passage 142 except when chuck assemblies 33a and 33b are at loading position L, and to communicate with radial passage 142' except when chuck assemblies 33'a and 33'b are at the loading position.

As shown on FIG. 11, end portion 30 of the reel spindle has diametrically opposed radial passages 144 and 144' opening from the surface of bore 127 into axial passages 145 and 145', respectively. Radial passages 144 and 144' are axially located to register with circumferential groove 136 and radial vent passage 139 of core 126. Groove 136 is circumferentially dimensioned and located to open into radial passage 144 when reel 25 is indexed to move chuck assemblies 33a and 33b to expiring position E, and to communicate with radial passage 144' when indexing movement of the reel brings chuck assemblies 33'a and 33'b to the expiring position.

Radial vent passage 139 is angularly located to communicate with radial passage 144 during movement of chuck assemblies 33a and 33b from expiring position E to loading position L, and to communicate with radial passage 144' during movement of chuck assemblies 33'a and 33'b from the expiring position to the loading position.

As shown on FIG. 10, groove 137 of core 126 extends completely around the latter so as to continuously communicate with a radial passage 146 extending from the surface of bore 127 and opening into an axial passage 147 in end portion 30 of the reel spindle.

As shown on FIG. 7, sealing rings 148 are provided on core 126 at axial locations between grooves 134, 135, 136 and 137 and at the opposite ends of the core. Further, as shown with respect to the axial passages 143 and 145', all of the above described axial passages formed in end portion 30 may be closed at the outer end of the latter, by a cover plate 149. Such axial passages all extend along spindle 23 at least beyond the inner surface of side frame member A. Radially outward opening passages 150 (FIG. 7) extend from the inner ends of axial passages 141, 141', 143, 143', 145, 145' and 147, into connector blocks 151 secured on spindle 23 between reel arm 24A and side frame member A and from which axial conduits 152 and/or radial conduits 153 extend. The radial conduits 153 extend from those connector blocks associated with axial passages 141, 141', 143, 143' and 147 intended to supply compressed air to chuck assemblies 33a and 33'a carried by reel arm 24A, and the axial conduits 152 extend from those connector blocks 151 associated with axial passages 145, 145' and 147 which are intended to supply compressed air to chuck assemblies 33b and 33'b carried by reel arm 24B. As shown on FIG. 1, axial conduits 152 extend through both reel arms to connector blocks 154 mounted on spindle 23 between reel arm 24B and side frame member B and from which radial conduits 155 extend to the respective chuck assemblies.

Referring now to FIG. 13, it will be seen that compressed air for operating the chuck assemblies of rollstand 20 is conducted from a compressed air supply line 156 by way of a line or conduit 157 which is connected to bore 133 at the outer end of core 126 (FIG. 7) and which has a pressure regulating valve 158 and a needle or other throttling valve 159 interposed therein. Compressed air thus supplied to bore 133 is continuously transmitted through groove 137 and passage 147 to a line 160 from which lines 161 and 161' extend to valves 83a of chuck assemblies 33a and 33'a. Similarly, lines 162 and 162' extend from line 160 to valves 83b of chuck assemblies 33b and 33'b. Lines 163 and 163' branch from lines 162 and 162' and extend to valves 84b of chuck assemblies 33b and 33'b, respectively. Lines 164 and 165 extend from valves 83a and 84a, respectively, to the opposite sides or inlets of motor 71a in each of chuck assemblies 33a and 33'a, and lines 166 and 167 extend from valves 83b and 84b, respectively, to the opposite sides or inlets of motor 71b in each of chuck assemblies 33b and 33'b. Also branching from line 160 are lines 168 and 168' which extend to valves 98 in chuck assemblies 33a and 33'a, respectively, and each valve 98 is, in turn, connected by a line 169 with the line 165 of the respective chuck assembly.

A line 170 extends from line 157 and is connected to bore 131 of core 126 (FIG. 13) to supply compressed air through groove 135 and passages 143 and 143' to lines 171 and 171', respectively, extending to valves 84a of chuck assemblies 33a and 33'a. Lines 171 and 171' have check valves 172 interposed therein to permit flow through the respective lines only in the directions toward valves 84a.

Valves 83a and 84a are of a type that normally vent the respective lines 164 and 165 to the atmosphere. When valve 83a is actuated by member 89a, line 164 is connected with line 161 to supply compressed air to the OUT side of motor 71a, that is, in the direction for effecting axially outward movement of the respective shaft 35. When rod 86a is urged to its neutral position by spring 97a, finger 94 of member 92 actuates valve 84a and the latter thereby connects line 165 with line 171. If rotary valve 125 is positioned to supply compressed air to line 171, the actuation of valve 84a by finger 94 causes the compressed air to enter the IN side of motor 71a through line 165 and thereby urge the motor to rotate in the direction for effecting axially inward movement of the respective shaft 35.

Valve 98 normally blocks the passage between lines 168 and 169 so that compressed air is supplied to the IN side of motor 71a through lines 168 and 169 only upon actuation of valve 98 by the nose of lever 100.

Valves 83b and 84b also normally vent the respective lines 166 and 167 to the atmosphere. Valve 83b, when actuated by member 89b, connects line 162 with line 166 to supply compressed air to the OUT side of motor 71b for effecting axially outward movement of the respective shaft 35. Similarly, valve 84b, when actuated by cam 123 on arm 122, connects line 163 with line 167 to supply compressed air to the IN side of motor 71b for causing operation of the motor in the direction to effect axially inward movement of the shaft 35.

The cam surface 123 on weighted arm 122 extends along a substantially semi-circular arc so as to be engageable with actuator 95b of valve 94b only when the related chuck assembly is in either expiring position E or in loading position L. When the chuck assembly is in expiring position E, the portion of cam 123 then engaging actuator 95b is effective to depress the latter and thereby actuate valve 84b even with rod 86b in its neutral position as determined by spring 97b. However, when the chuck assembly is at loading position L, the portion of cam 123 then engageable with actuator 95b does not depress the latter so long as rod 86b is in its neutral position. Thus, with the chuck assembly at loading position L, actuation of valve 84b by cam surface 123 occurs only when handle 106b is manipulated or moved downwardly, as viewed on FIG. 13, so as to affect displacement of rod 86b toward the left.

As further shown on FIG. 13, compressed air is conducted from main supply conduit 156 through a line 173 having a pressure regulating valve 174 and a throttling valve 175 interposed therein and being connected to parallel lines 176 and 177 which are, in turn, connected to the outer ends of bores 130 and 132 in core 126 of rotary valve 125. Normally closed solenoid valves 178 and 179 are interposed in lines 176 and 177, respectively, to permit the flow of compressed air through the line 176 or 177 only when the respective solenoid valve is energized, as hereinafter described in detail.

Lines 180 and 180′ extend from axial passages 141 and 141′, respectively, to valves 119a of chuck assemblies 33a and 33′a, and such valves are in turn connected by lines 181 and 181′ to cylinders 112a of the respective chuck assemblies. Similarly, axial passages 145 and 145′ of rotary valve 125 are connected by lines 182 and 182′ to valves 119b of chuck assemblies 33b and 33′b, and such valves are, in turn, connected by lines 183 and 183′ to cylinders 112b of the respective chuck assemblies. Each limit valve 119a establishes communication between lines 180 and 181 or lines 180′ and 181′ when the valve actuator 118a is engaged by cam 117a. However, when the valve actuator rides off cam 117a in response to axial outward movement of the respective shaft 35 to a predetermined position, the respective valve 119a serves to vent the line 181 or 181′ to the atmosphere. Similarly, each limit valve 119b establishes communication between lines 182 and 183 or lines 182′ and 183′ only so long as the valve actuator 118b is engaged by the associated cam 117b and, when the valve actuator rides off the cam, the valve 119b vents the line 183 or 183′ to the atmosphere.

Rollstand 20 is shown to have an axially opening, tapped bore 184 in the end portion of reel spindle 23 extending through side frame member B (FIG. 14). An adjusting screw 185 is threadably engaged in tapped bore 184 and is rotatably supported and held against axial displacement in a bearing support 186 extending from side frame member B. Thus, rotation of screw 185 in one direction or the other effects movement of reel 25, as a unit, parallel to the axes of the web supply rolls supported by the reel. Rotation of adjusting screw 185 may be effected by a pulley 187 secured on its outer end and engaged by a belt 188 which runs around a drive pulley 189 secured on the shaft of a reversible electric motor 190.

As shown on FIG. 14, rollstand 20 may be associated with a fine or accurate transverse register correction device 191 which engages the unwinding web W in advance of printing or other web processing cylinders 21 with respect to which the web is to be transversely registered. The device 191 is shown to include parallel web contacting rollers 192 and 193 having their opposite ends rotatably journaled in bearing blocks 194a and 194b which are centrally pivoted on pins 195 carried by the free ends of arms 196. Arms 196 are pivotally mounted on shafts 197 carried by brackets 198 extending from side frame members A and B, and the various parts are dimensioned so that, when rollers 192 and 193 are in their illustrated central or neutral position, arms 196 converge in the direction of movement of the web. Bearing block 194a carries a nut member 199 in threaded engagement with an adjustment screw 200 which is connected by a universal coupling 201 with the shaft of a reversible correction motor 202 mounted on the adjacent side frame member A.

It will be apparent that rotation of the shaft of motor 202, in one direction or the other, causes corresponding lateral displacement of rollers 192 and 193 which, by reason of the previously mentioned convergence of arms 196 in the neutral or central position of the rollers, are also tilted or inclined from the lateral. As shown, web W passes over roller 193 and then under roller 192 so that the tilting action of the rollers that accompanies the lateral displacement thereof is effective to urge the web laterally in the same direction as the lateral displacement of rollers 192 and 193 and thereby corrects for a deviation in the opposite lateral direction from correct transverse registration with respect to cylinders 21.

Motor 202 is connected through conductors 203 with a reversing controller 204 of conventional design. Controller 204 is energizable by means of a photoelectric control system including a photoelectric scanning head 205 that may be of the type commercially available from The Specialty Control Department of General Electric Company, Waynesboro, Va., as Item No. 3S7515PS102. Scanning head 205 is suitably mounted so that a light source therein directs a beam of light against either the longitudinal edge of the moving web W or against a register line preprinted along such edge at a location along the web that is intermediate transverse register correction-device 191 and printing cylinders 21 with which an edge of the moving web is to be transversely registered.

Scanning head 205 is laterally located so that, when there is correct transverse registration between the related longitudinal edge of the web or the register line preprinted thereon and cylinders 21, the area or region of the web surface illuminated by the beam of light from scanning head 205 is exactly bisected by the longitudinal edge of the web or by one longitudinal edge of the preprinted register line thereon, and thereby establishes the normal intensity of light reflected from the web to a photoelectric cell, also included in the scanning head, during correct transverse register. Any deviation of the transverse position or sideplay of the longitudinal edge of the web toward one side or the other from the position for correct transverse register causes a change in the intensity of light reflected by the web from the light source of head 205 into the photoelectric cell thereof, and thereby alters the voltage generated by the cell.

The voltage generated by the photoelectric cell of head 205 is fed through conductors 206 to a register control panel 207 which may be of the type that is commercially available from The Specialty Control Department of General Electric Company, Waynesboro, Va., as Item No. 3S7515SR100, and which generally includes a Wheatstone bridge network that is balanced when the strength of the electric signal from scanning head 205 corresponds to correct transverse register of the web. The register control panel 207 is energized by way of conductors 208 and 209 respectively extending from power supply lines $L_1$ and $L_2$. Motor 202 is energizable by way of a conductor 210 connected to conductor 208, and hence to line $L_1$, and by way of one or the other of two conductors 211 and 212 extending to controller 204 from control panel 207. Any deviation in the strength of the electrical signals received from scanning head 205 by control panel 207 serves to unbalance the bridge network in the latter and thereby generates an error signal which is suitably amplified within the control panel and fed to reversing controller 204 through conductor 211 or conductor 212. In response to an amplified error signal received from control panel 207 by controller 204, the latter causes operation of motor 202 in the direction for laterally displacing rollers 192 and 193 in the sense required to restore the desired accurate transverse registration of the web.

So long as the deviation of the moving web from transverse registration with respect to printing cylinders 21 is within a predetermined small range, device 191 operates to effect fine or accurate transverse register corrections in the manner previously described. However, if the deviation of the web from transverse registration with respect to printing cylinders 21 is beyond the predetermined small range or limits of accurate operation of device 191, then the unwinding web supply roll is moved axially by rollstand 20 to impart relatively coarse transverse register corrections to the web in advance of device 191 for returning the web to within the limits of the normal operating range of device 191.

Depending upon whether the unwinding web supply roll is at normal running position R or at expiring position E, the axial movements of the unwinding web roll for imparting relatively coarse register corrections to the web are effected either by axially displacing reel 25 through suitable operation of motor 190, or by suitably operating the motors 71a and 71b of the chuck assemblies supporting the unwinding web roll so as to axially displace the roll with respect to reel arms 24A and 24B.

When the deviation of web W from correct transverse register with respect to printing cylinders 21 is beyond the predetermined small range of accurate operation of device 191, rollers 192 and 193 are displaced by correction motor 202 to a relatively large extent in seeking to correct for such deviation. A support 213 extends from bearing block 194b of device 191 and carries spaced apart cams 214 and 215 which are respectively engageable with actuators 216 and 217 of normally open detecting switches 218 and 219, respectively. When rollers 192 and 193 are within the normal operating range of device 191, as shown, both actuators 216 and 217 are free of the respective cams 214 and 215 and switches 218 and 219 remain in their normal open condition. Upon displacement of rollers 192 and 193 in one lateral direction beyond the respective limit of the normal operating range of device 191, actuator 216 is engaged by cam 214 to close switch 218. Similarly, upon lateral displacement of rollers 192 and 193 in the opposite direction beyond the respective limit of the normal operating range of device 191, cam 215 engages actuator 217 to close switch 219.

Switch 218 is connected in series with the coil of a control relay 220 in an energizing circuit for the latter that includes a conductor 221 extending from line $L_1$ to relay 220, a conductor 222 extending from relay 220 to switch 218 and a conductor 223 extending from the switch to line $L_2$. Swith 219 is similarly connected in series with the coil of a control relay 224 in an energizing circuit for the latter that includes a conductor 225 extending from line $L_1$ to relay 224, a conductor 226 extending from relay 224 to switch 219 and a conductor 227 extending from the switch to conductor 223 and hence to line $L_2$. Thus, control relays 220 and 224 are selectively energized only in response to the displacement of rollers 192 and 193 in one direction or the other beyond the limits of the normal operating range of device 191.

Referring further to FIG. 14, it will be seen that the electric control system for rollstand 20 further includes a selector relay 228 having a normally closed contact 228a and normally open contacts 228b and 228c. Normally closed contact 228a is interposed between a conductor 229 extending from line $L_1$ and a conductor 230 extending to one side of relay contact 220a. A conductor 231 extends from the other side of relay contact 220a to one side of a normally closed limit switch 232 which is, in turn, connected through a conductor 233 to one side of a normally closed contact 234a of a motor starter relay 234. The other side of relay contact 234a is connected through conductor 235 with the coil of another motor starter relay 236 which is, in turn, connected to line $L_2$ through a conductor 237. Branching from conductor 230 to one side of relay contact 224a is a conductor 238, and the other side of such relay contact is connected by a conductor 239 to one side of a normally closed limit switch 240. The other side of limit switch 240 is connected by a conductor 241, a normally closed contact 236a of motor starter relay 236, and a conductor 242 to the coil of motor starter relay 234 which is, in turn, connected to line $L_2$ through a conductor 243.

Relays 234 and 236 further have normally open contacts 234b and 236b respectively interposed between conductors 244 and 245 extending from line $L_1$ and conductors 246 and 247 extending to reversible electric motor 190 which is further connected to line $L_2$ by a conductor 248.

Thus, so long as relay 228 remains deenergized to retain its contact 228a in its normally closed condition, energizing of relay 220 in response to excessive lateral displacement of rollers 192 and 193 toward side frame member B is effective to cause energizing of motor starter relay 236 for closing contact 236b thereof and thereby effect operation of motor 190 in the direction for displacing reel 25 axially toward side frame member B, thereby to impart a coarse transverse register correction to the web for returning the latter to a sidelay or position within the limits of the normal operating range of device 191. Similarly, so long as relay 228 is deenergized, energizing of relay 224 in response to excessive lateral displacement of rollers 192 and 193 toward side frame member A causes energization of motor starter relay 234 for operating motor 190 in the direction causing axial displacement of reel 25 toward side frame member A, thereby to again impart a coarse transverse register correction to the web for returning the latter to a position within the limits of the normal operating range of device 191.

As shown on FIG. 1, normally closed limit switches 232 and 240 are mounted on a bracket 249 supported by side frame member B and are disposed at opposite sides of one end portion of a lever 250 which is pivoted at 251 on bracket 249. The other end of lever 250 is urged into contact with the adjacent end of reel spindle 23, as by a spring 252. It will be apparent that axial movement of reel 25 toward side frame member B beyond a predetermined limit will rock lever 250 sufficiently to cause it to engage limit switch 232 for opening the latter. Such opening of switch 232 interrupts the energizing circuit of relay 236 for preventing further operation of motor 190 in the direction to displace reel 25 toward side frame member B. Conversely, axial displacement of reel 25 toward side frame member A beyond a predetermined limit will permit spring 252 to rock lever 250 sufficiently to cause the lever to engage limit switch 240 and open the latter thereby interrupting the energizing circuit of relay 234 and preventing further operation of motor 190 in the direction to displace the reel toward side frame member A.

In rollstand 20, indexing movement of reel 25 by operation of motor 26 for moving a new web roll to splicing position S may be automatically initiated when the unwinding web roll at normal running position R has had its diameter reduced to a predetermined extent. As shown on FIG. 14, a suitable arrangement for controlling the operation of motor 26, as above, may include a photoelectric sensing device 253 fixedly mounted to direct a light beam 254 toward a fixed reflector 255. The light beam 254 is initially intercepted by the unwinding web roll at running position R. However, when the progressively decreasing diameter of the roll at position R has been reduced to the predetermined size shown on FIG. 14, light beam 254 passes the periphery of the roll and is reflected from reflector 255 so as to impinge on a photoelectric cell in sensing device 253. As shown, sensing device 253 may be connected between a conductor 256 extending from line $L_1$ and a conductor 257 extending to the coil of a relay 258 which is connected to line $L_2$ by a conductor 259. Relay 258 has a normally open contact 258a interposed between a conductor 260 extending from line 256 and a conductor 261 extending to a controller 262 for motor 26. Controller 262 is further connected by a conductor 263 to conductor 259 so that, when reflected light impinges on the photoelectric cell in sensing device 253 to cause energizing of relay 258 and closing of the contact 258a thereof, the circuit for energizing motor controller 262 is completed, and hence motor 26 is operated to rotate reel 25 for moving the unwinding web supply roll Ia from normal running position R to expiring position E. Preferably, a pressure responsive switch 264 has its contact interposed in conductor 261, as shown on FIG. 14, and is responsive to the pressure of compressed air in line 157, as shown on FIG. 13, so that the contact of switch 264 will be closed to permit operation of motor 26 for moving the unwinding roll from running position R to expiring position E and simultaneously moving a new web roll from loading position L to splicing position S only when the pressure of compressed air in line 157 exceeds a predetermined value.

A conductor 265 branches from conductor 261 to the coil of relay 228 which is, in turn, connected to line $L_2$ by a conductor 266. Thus, relay 228 is energized simultaneously with the indexing of reel 25 for moving the unwinding web roll from running position R to expiring position E. Normally open contact 228c of relay 228 is connected at one side to conductor 229 and at its other side to a conductor 267 extending to one side of contact 220b of relay 220. The other side of contact 220b is connected to line $L_2$ by a conductor 268 having the coil of solenoid valve 179 interposed therein. A conductor 269 branches from conductor 267 to one side of contact 224b of relay 224 and the other side of that relay contact is connected to line $L_2$ by a conductor 270 having the coil of solenoid valve 178 interposed therein. Thus, when relay 228 is energized simultaneously with the movement of the unwinding roll from running position R to expiring position E, and thereby opens its contact 228a for interrupting the circuits including contacts 220a and 224a of relays 220 and 224, contact 228c is simultaneously closed to complete the circuits for energizing solenoid valve 178 in response to energizing of relay 224, or for energizing solenoid valve 179 in response to energizing of relay 220.

Normally open contact 228b of relay 228 is connected between conductor 229 extending from line $L_1$ and a conductor 271. Conductors 272 and 273 are connected in parallel between conductor 271 and conductors 231 and 239, respectively, and normally open switches 274 and 275 are interposed in conductors 272 and 273. As shown on FIG. 1, the normally open switches 274 and 275 are also mounted on bracket 249 at opposite sides of lever 250. One or the other of switches 274 and 275 is closed by lever 250 whenever reel 25 is disposed away from a normal axial position between side frame members A and B. Thus, if reel 25 is away from such normal axial position when the reel is indexed to move the new web roll from loading position L to splicing position S, at which time relay 228 is simultaneously energized to close its contact 228b, the closing of switch 274 or switch 275, depending upon the direction in which the reel is away from its normal axial position, will complete the circuit for energizing motor starter relay 236 or 234, respectively, and thereby operate motor 190 in the direction for returning reel 25 to its normal axial position.

The operation of rollstand 20 will now be described starting with reel 25 disposed as shown in broken lines on FIG. 12, that is, with roll Ia from which web W is being unwound disposed at normal running position R, and with ends of the reel arms, for example, those carrying chuck assemblies 33'a and 33'b disposed at loading position L to receive a new web supply roll Ib therebetween.

*Loading a new web supply roll*

When chuck assemblies 33'a and 33'b are disposed at loading position L, rotary valve 125 channels compressed air thereto only through lines 161', 162' and 171'. In order to permit the insertion of the new web roll between chuck assemblies 33'a and 33'b, the shafts 35 thereof must be moved axially outward so as to provide an axial distance between the inner ends of the shafts that is greater than the axial dimension of the roll. Axially outward movement of shafts 35 is effected by manually displacing handles 106a and 106b in the OUT direction, as indicated on FIG. 13. Such displacement of handle 106a moves rod 86a toward the left, as viewed on FIG. 13, so that member 89a actuates valve 83a for establishing communication between line 161' and line 164, while finger 94 moves away from the actuator of valve 84a to permit the latter to vent line 165. Accordingly, compressed air is supplied to motor 71a in the direction for effecting axially outward movement of the related shaft 35. Gear 77 of chuck assembly 33'a moves outwardly with the related shaft 35 and finally acts against member 89a to move the latter away from actuator of valve 83a so that such valve again vents line 164 to the atmosphere and thereby stops operation of motor 71a.

Displacement of handle 106b of chuck assembly 33'b in the OUT direction causes member 89b to actuate valve 83b and thereby connect line 162' with line 166 for supplying compressed air to motor 71b in the direction for effecting axially outward movement of the related shaft 35 while line 167 is vented to the atmosphere by valve 84b. Gear 77 of chuck assembly 33'b also moves axially outward with the related shaft 35 so as to act against member 89b and thereby move the latter away from valve 83b, whereupon such valve vents line 166 to the atmosphere for stopping the operation of motor 71b.

After the shafts 35 of chuck assemblies 33'a and 33'b have been moved axially outward, the new web supply roll is positioned between the chuck assemblies with its core 34 aligned with shafts 35 and intentionally positioned closer to reel arm 24A than to reel arm 24B, for example, by a distance of from one-eighth to one-quarter inch. Shaft 35 of chuck assembly 33'a is turned by hand to align key 81 thereof with the mating keyway 82 of core 34. Handle 106a is then moved to its IN position whereby lever 103a is rocked in the direction moving pivot pin 102a toward the adjacent end of the web roll. Such movement of pivot pin 102a causes detector rod 109 to be projected inwardly from arm 24a, for example, as shown in broken lines on FIG. 2, and to bear against the adjacent end surface of the new web roll. Since the end surface of the new web roll limits the projection of detector rod 109, the movement of pivot pin 102a inwardly or toward the end of the web roll causes levers 101 and 100 to pivot about the axis of pin 102a, whereby lever 100 actuates valve 98 for communicating line 168' with line 169. Thus, compressed air is supplied from line 168' through valve 98, line 169 and line 165 to the IN side of motor 71a, while the opposite side of the motor is exhausted or vented to the atmosphere at valve 83a. Accordingly, motor 71a is operated to effect axially inward movement of shaft 35 of chuck assembly 33'a into the adjacent end of the roll core 34. When abutment surfaces 69 of locking segments 68 engage the adjacent end face 70 of the roll core, further axially inward movement of shaft 35 causes radial expansion of the locking segments into clamping engagement with inner surface 34 of the roll core, as previously described. After such clamping engagement, further axially inward movement of shaft 35 of chuck assembly 33'a effects corresponding axial movement of the new web roll and thereby permits further inward projection of detector rod 109 from arm 24A. Such further inward movement of detector rod 109 permits levers 100 and 101 to rock in the direction for relieving the pressure of the nose of lever 100 against actuator 99 of valve 98. Finally, when the new web roll has been moved to a predetermined or centered axial position between reel arms 24A and 24B, lever 100 releases the actuator of valve 98 whereby the latter again interrupts the communication between line 168' and line 169, and thereby halts operation of motor 71a.

After the new web roll has been axially located and one end of its core has been clamped by chuck assembly 33'a, as described above, handle 106b of chuck assembly 33'b is moved to its IN position, whereby cam surface 123 of actuator arm 122 is displaced with rod 86b to actuate valve 84b and thereby supply compressed air from line 162' through line 167 to the IN side of motor 71b, while the OUT side of the motor is exhausted or vented to the atmosphere through valve 83b. Thus, motor 71b is operated to move the associated shaft 35 axially into the adjacent end of roll core 34 for effecting clamping engagement of its locking segments 52 with the inner surface of the roll core.

*Sidelay or course transverse register control of the web being unwound from a roll at normal running position*

During the above described loading or lock-up of a new web supply roll between chuck assemblies 33'a and 33'b at loading position L, chuck assemblies 33a and 33b carrying the unwinding roll Ia are at normal running position R. Web W being unwound from roll Ia and delivered to printing cylinders 21 is acted upon by side register correction device 191 in advance of the printing cylinders. As previously described, such device 191 is effective to correct for deviations of web W from correct transverse register with respect to cylinders 21 within a predetermined range of operation. Deviations from correct transverse register beyond the limits of such predetermined range of operation of device 191 result in energization of relay 220 or relay 224 through the cooperative action of cam 214 with actuator 216 of switch 218 or of cam 215 with actuator 217 of switch 219.

So long as reel 25 is in the position shown in broken lines on FIG. 12, that is, with the unwinding roll Ia at normal running position R, relay 228 (FIG. 14) remains deenergized and thus maintains its contact 228a in closed condition. When contact 228a is in closed condition, the energization of relay 220 or relay 224 causes energization of motor starter relay 236 or 234, respectively, for operating motor 190 in the direction moving reel 25 axially in the sense for returning web W to a sidelay or lateral position within the range of accurate operation of device 191.

*Indexing of the reel to move a new web roll to splicing position*

When the unwinding roll at running position R has had its diameter reduced to a predetermined size, sensing device 253 causes energization of relay 258 for closing its contact 258a and thereby operating motor 26 for rotating reel 25, provided that pressure sensitive switch 264 is closed. As reel 25 turns from the position shown in broken lines on FIG. 12, rotary valve 125 establishes communication between line 170 and line 171' (FIG. 13) extending to valve 84a of the right-hand chuck assembly 33'a which is moving from loading position L toward splicing position S. Since rod 86a of chuck assembly 33'a, when in its neutral position, causes finger 94 to actuate valve 84a, compressed air is supplied from line 171 through line 165 to the IN side of motor 71a while the OUT side of that motor is exhausted or vented to atmosphere through valve 83a. Thus, pressure is supplied to motor 71a of chuck assembly 33'a so as to continuously urge its shaft 35 axially into the adjacent end of core 34 of the new web roll for continuously maintaining the desired lock-up or clamping pressure. Although valves 83b and 84b of the left-hand chuck assembly 33'b vent both sides of motor 71b to the atmosphere, shaft 35 of chuck assembly 33'b resists axial movement of the new web roll in response to the lock-up or clamping pressure applied by chuck assembly 33'a by reason of the irreversible transmission provided by the worm 76 and worm gear 77 of chuck assembly 33'b. If, for any reason, chuck assemblies 33'a and 33'b are not properly seated in the ends of the core of new web roll Ib when indexing of reel 25 is initiated, the communication of line 171' with line 170 at rotary valve 125 will cause operation of motor 71a of chuck assembly 33'a so as to tend to correct the improper seating of the chuck assemblies, and such operation of motor 71a will result in a decrease in the pressure in line 170, and hence also in line 157. Such drop in pressure in line 157 will be sensed by pressure sensitive switch 264 to open its contact, and thereby halt operation of motor 26. Thus, movement of an improperly clamped or locked-up new web roll to splicing position is prevented. Similarly, for any reason the pressure of compressed air in main supply line 156 is inadequate to achieve proper clamping of the new web roll by chuck assemblies 33'a and 33'b, pressure sensitive switch 264 will open the circuit for motor 26 and thereby prevent movement of the new web roll to splicing position.

Energization of relay 258 for initiating movement of the new web roll from loading position L to splicing position S causes simultaneous energization of relay 228. Energizing of relay 228 opens its contact 228a, and thereby isolates the control circuits of motor starter relays 234 and 236 from relays 220 and 224, so that motor 190 is no longer operated in response to deviation of web W from correct transverse register with respect to cylinders 21. Energization of relay 228 closes its contact 228b, whereby motor starter relays 234 and 236 come under the control of switches 275 and 274, respectively. Thus, if reel 25 is disposed away from a normal axial position thereof when the reel is indexed to move the new web roll toward splicing position, one or the other of switches 274 and 275 is actuated by lever 250 so as to cause operation of motor 190 in the sense for returning reel 25 to its normal axial position between side frame members A and B. The predetermined or central position at which the new web roll is locked up or clamped between arms 24A and 24B, and the normal axial position between side frame members A and B to which the reel 25 is returned during movement of the new web roll to splicing position are selected so that the new web roll is aligned or laterally registered with the desired path of the web through printing cylinders 21 when the new web roll arrives at splicing position S.

*Sidelay or coarse transverse register control of the web when the unwinding roll is at expiring position*

Indexing of reel 25 for moving new web roll Ib to splicing position S causes simultaneous movement of unwinding roll Ia carried by chuck assemblies 33a and 33b to expiring position E. Such indexing of reel 25 causes rotary valve 125 to establish communication between lines 176 and 180 and between lines 177 and 182 (FIG. 13). When chuck assemblies 33a and 33b are moved from running position R to expiring position E, rotary valve 125 continues to establish communication between lines 170 and 171. Thus, with rod 86a of chuck assembly 33'a urged to its neutral position by spring 97a so that finger 94 actuates valve 84a, pressure is continuously applied to the IN side of motor 71a by way of line 171, valve 84a and line 165. As chuck assembly 33b is moved toward expiring position E, cam surface 123 on weighted arm 122 actuates valve 84b even though rod 86b remains in its neutral position so that pressure is also applied to the IN side of motor 71b by way of lines 162 and 163, valve 84b and line 167. It will also be noted that, when chuck assemblies 33a and 33b are at expiring position E, and their rods 86a and 86b are in their neutral positions, as shown on FIG. 13, valves 83a and 83b vent the OUT sides of the respective motors 71a and 71b to the atmosphere.

The energization of relay 228 (FIG. 14) upon initiation of indexing of reel 25 for moving the unwinding roll to expiring position E causes closing of relay contact 228c and thereby completes the circuits for energization of solenoid valve 178 in response to energization of relay 224 and for energization of solenoid valve 179 in response to energization of relay 220.

If web W being unwound from roll Ia at expiring position E deviates from correct transverse register with respect to printing cylinders 21 in the direction toward side frame member B beyond the range of accurate operation of device 191 so that rollers 192 and 193 of the latter are displaced laterally toward side frame member A to the extent causing cam 215 to close switch 219 and thereby energize relay 224, solenoid valve 178 is energized by way of closed contact 224b. Energizing of solenoid valve 178 permits compressed air to be supplied through lines 173 and 176, rotary valve 125, line 180, cam controlled valve 119a and line 181 to cylinder 112a of chuck assembly 33a. Compressed air thus admitted to cylinder 112a causes the piston rod 113a to act against pin 102a of lever 103a and thereby rock the latter in the direction for moving rod 86a toward the left, as viewed on FIG. 13. Such movement of rod 86a causes member 89a to actuate valve 83a so that compresed air is supplied to the OUT side of motor 71a while finger 94 moves away from the actuator of valve 84a which thereby vents the IN side of motor 71a. Thus, so long as solenoid valve 178 is energized and so long as valve 119a is actuated by cam 117a, motor 71a is operated in the direction effecting axially outward movement of shaft 35 of chuck assembly 33a. Since compressed air is being simultaneously supplied to the IN side of motor 71b of chuck assembly 33b through the actuated valve 84b thereof, the axially outward movement of shaft 35 of chuck assembly 33a is accompanied by a corresponding axially inward movement of shaft 35 of chuck assembly 33b to maintain the lock-up or clamping of unwinding roll Ia while the latter is displaced axially relative to reel arms 24A and 24B in the direction toward side frame member A, that is, in the direction imparting a coarse transverse register correction tending to return the web to within the range of accurate operation of device 191.

Conversely, if the deviation of the unwinding web from correct transverse registration with respect to printing cylinders 21 causes excessive lateral displacement of rollers 192 and 193 beyond the accurate operating range of device 191 in the direction toward side frame member B, the resulting closing of switch 218 and energizing of relay 220 completes the circuit for energizing solenoid valve 179 through closed relay contact 220b. Energizing of solenoid valve 179 causes compressed air to be supplied to cylinder 112b of chuck assembly 33b through line 177, rotary valve 125, line 182, cam actuated valve 119b and line 183. Compressed air admitted to cylinder 112b causes piston rod 113b to move pin 102b and thereby rock lever 103b in the direction for moving rod 86b toward the right, as viewed on FIG. 13. Such movement of rod 86b causes member 89b to actuate valve 83b for supplying compressed air to the OUT side of motor 71b, while cam surface 123 is moved away from the actuator of valve 84b so that the latter then vents the IN side of motor 71b to the atmosphere. Thus, motor 71b is driven in the direction for moving shaft 35 of chuck assembly 33b axially outward. During such axially outward movement of the shaft of chuck assembly 33b, rod 86a of chuck assembly 33a is retained in its neutral position by spring 97a so that finger 94 actuates valve 84a and compressed air is supplied to the IN side of motor 71a while the OUT side of such motor is vented to the atmosphere through valve 83a. As shaft 35 of chuck assembly 33b moves axially outward, shaft 35 of chuck assembly 33a moves axially inward to retain the lock-up or clamping pressure at the ends of the unwinding roll which is being shifted axially relative to reel arms 24A and 24B in the direction toward side frame member B.

Thus, when the unwinding roll Ia is at expiring position E, coarse transverse register corrections are effected by axially displacing the relatively light expiring roll with respect to reel arms 24A and 24B, while the reel 25 is laterally or axially positioned, as a unit, to ensure that the heavy new web roll Ib at splicing position S is transversely registered with the desired path of the web through printing cylinders 21. Accordingly, the run of web W extending from expiring roll Ia at expiring position E to idler roller 31 is substantially in lateral registration with the new web roll Ib when it is spliced to the periphery thereof by operation of splicing assembly 32, as previously described herein.

Following the splicing operation, reel 25 may be again indexed to move expired roll Ia to loading position L and simultaneously to move new web roll Ib, from which the web is being unwound, to normal running position R. When chuck assemblies 33a and 33b carrying expired roll Ia are moved to loading position L, rotary valve 125 interrupts the supplying of compressed air to lines 171, 180 and 182 and relay 228 is again suitably deenergized so that chuck assemblies 33a and 33b no longer automatically respond to energization of relay 220 or 224 by reason of excessive deviation of the unwinding web from correct transverse registration with respect to the printing cylinders. When chuck assemblies 33a and 33b are at loading position L, their handles 106a and 106b can be moved to their OUT positions to effect axially outward movement of the shafts 135 and thereby release the core of the expired roll which can be replaced by the next new web supply roll to be clamped between chuck assembly 33a and 33b.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention, except as defined in the appended claims.

What is claimed is:

1. A rollstand having support members spaced apart to receive therebetween a roll of web material wound on an open-ended core, and chuck assemblies carried by said support members for rotatably supporting the roll, wherein at least one of said chuck assemblies comprises a roll supporting shaft mounted in bearings for free rotation in the respective support member, means for displacing said shaft axially relative to said support member so as to move an end portion of said shaft into and out of an end of said roll core, said end portion carrying locking segments having outer surfaces to be seated against the inner surface of said core, and means responsive to axial displacement of said shaft in the direction to move said end portion into said core end for expanding said segments within said core end radially into roll supporting and clamping engagement with said inner surface.

2. A rollstand according to claim 1, in which said shaft is held against axial displacement relative to said bearings, said bearings are carried by a housing displaceable relative to said respective support member in the direction of the axis of said shaft, and said means for displacing the shaft axially acts to effect displacement of said housing relative to said support member in said direction of the shaft axis.

3. A rollstand according to claim 1, in which said bearings are mounted in a bearing housing with respect to which said shaft is held against axial displacement, said housing is threadably engaged with the respective support member to axially displace said shaft upon rotation of the housing, and said means for displacing the shaft includes means for effecting rotation of said bearing housing.

4. A rollstand according to claim 1, in which said bearings are mounted in a housing displaceable relative to said respective support member parallel to the axis of said shaft, and said means for displacing the shaft includes a reversible, fluid pressure operated motor and irreversible transmission means for effecting displacement of said housing only upon operation of said motor.

5. A rollstand according to claim 1, in which said locking segments are movable radially and axially with respect to said shaft, and in which said means for expanding the segments radially includes co-engaging surfaces on said segments and end portion, at least some of said co-engaging surfaces being inclined with respect to the axis of said shaft to effect said expanding of the segments upon axial movement of said end portion relative to said segments in the direction into the core, and means for limiting the movement into the core of said segments with said end portion of the shaft, whereupon further axial movement of the shaft in the direction into the core results in said clamping engagement of the segments with said inner surface of the core.

6. A rollstand according to claim 1, wherein each of said chuck assemblies comprises a shaft, locking segments thereon and means for displacing the shafts as aforesaid, and each said means for displacing the shaft includes individual reversible power operated means so that, after said segments of both chuck assemblies have been expanded radially into clamping engagement with said inner surface of the roll core at opposite ends of the latter, the shafts of said chuck assemblies can be moved simultaneously in the same axial direction by the related power operated means for axially displacing the supported roll relative to said support members while maintaining said clamping engagement.

7. A rollstand according to claim 6; in which said bearings for each shaft are carried by a housing mounted in the adjacent support member for movement parallel to the axis of said shaft, and wherein said reversible power operated means of each chuck assembly includes a reversible, fluid pressure operated motor, and irreversible transmission means connecting said motor with said bearing housing to permit said movement of the latter only upon operation of said motor.

8. A rollstand according to claim 1, wherein each of said chuck assemblies comprises a shaft, locking segments thereon and means for axially displacing the shaft as aforesaid, and each said means for displacing the shaft includes individual reversible power operated means; and further comprising means halting axial movement of said shaft of one of the chuck assemblies in the direction into the core end when the web roll is at a predetermined axial position between said support members.

9. A rollstand according to claim 1, wherein each of said chuck assemblies comprises a shaft, locking segments thereon and means for axially displacing the shaft as aforesaid, and each said means for displacing the shaft including individual reversible power operated means, and control means which is manually actuable to cause said power operated means to move the related shaft axially in the directions into and out of the adjacent core end; and
wherein said control means of one of said chuck assemblies includes detecting means sensing the axial position of the web roll between said support members when said one control means is actuated to cause axial movement of the respective shaft in the direction into said adjacent core end and being operative to halt axial movement of said respective shaft in said direction upon disposition of the web roll at a predetermined axial position between said support members.

10. A rollstand according to claim 9; wherein said power operated means of each chuck assembly includes a reversible motor operable by fluid under pressure, and said control means includes means for supplying fluid under pressure to said motor and having a valve therein actuable to cause the fluid to be supplied to said motor in the direction for causing axial movement of the respective shaft into the adjacent core end, and manipulatable actuating means for said valve; and
wherein said detecting means is coupled with said actuating means of said one control means and is urged to bear against an adjacent end face of the web roll upon manipulation of the coupled actuating means for actuating the related valve so long as the web roll is away from said predetermined axial position in the direction toward the support member carrying said one chuck assembly.

11. A rollstand according to claim 1; wherein each of said chuck assemblies comprises a shaft, locking segments thereon and means for displacing the shaft as aforesaid, and each said means for displacing the shaft includes a reversible fluid pressure operated motor, irreversible transmission means between said motor and said shaft of the respective chuck assembly to permit movement of the shaft axially relative to said support members only upon operation of the motor, and means for supplying fluid under pressure to said motor including control means actuatable during replacement of a web roll in the rollstand to cause said motor to effect axial movement of the respective shaft in the directions out of and into the adjacent core end; and
further comprising means operative during the unwinding of web material from a roll supported by said chuck assemblies to supply fluid under pressure to said motor of at least one of the chuck assemblies in the direction for axially urging the respective shaft into the adjacent core end, thereby to maintain the clamping engagement of the locking segments of both chuck assemblies with the roll core.

12. In a rollstand having support members spaced apart to receive therebetween a roll of web material wound on an open-ended core, and chuck assemblies carried by said support members for rotatably supporting the roll,
each of said chuck assemblies comprising a shaft mounted for free rotation and for axial displacement relative to the respective support member to move an end portion of the shaft into and out of an adjacent end of the roll core, locking members on said end portion of the shaft having outer surfaces presenting sections of a cylindrical surface, said locking members being movable along said shaft in directions that are inclined with respect to the axis of the shaft so as to radially expand said sections of the cylindrical surface in response to axial displacement of said shaft relative to said locking members in the direction into the adjacent core end, said locking members having abutment surfaces thereon extending radially outward beyond said sections of the cylindrical surface so as to bear axially against a radial end face on the roll core when said end portion of the shaft is projected therein, and means for exerting an axial force on said shaft in the direction to move said end portion of the shaft into said adjacent end of the roll core and, upon axial bearing of said abutment surfaces of the locking members against said radial end face, to effect radial expansion of said sections of the cylindrical surface into secure roll supporting and clamping engagement with the inner surface of the roll core.

13. In a rollstand for delivering a web continuously from one web supply roll after another to a web processing machine, the combination of
support means for carrying a web roll from which a web is being unwound and a new web roll to the periphery of which said unwinding web is to be spliced, said support means being mounted for an indexing movement to dispose the new roll in a splicing position and simultaneously to move the unwinding roll from a running position to an expiring position, said support means including respective pairs of support members spaced apart to receive the unwinding and new rolls therebetween and being displaceable as a unit parallel to the axes of the rolls and oppositely disposed rotary roll supports respectively mounted on and displaceable axially relative to said support members of each pair,
actuating means responsive to a change of sidelay of said web,
first means actuated by said actuating means to displace said support members as a unit parallel to said axis of the rolls so as to control said sidelay when the unwinding roll is in said running position, and
second means actuated by said actuating means to displace said roll supports of said support members holding the unwinding roll axially relative to said support members so as to control said sidelay when the unwinding roll is in said expiring position without disturbing the axial position of the new roll.

14. A rollstand according to claim 13; and means acting in coordination with said indexing movement to disconnect said first means from said actuating means, to connect said second means with said actuating means, and to return said support members to a normal axial position thereof in the event that said support members are disposed away from such normal position.

15. A rollstand according to claim 13; wherein said actuating means includes a device operative to correct deviations of transverse register of the unwinding web relative to the web processing machine within a predetermined range, control means actuated by said device upon deviation of the transverse register of the web beyond said range to alternatively cause said first means and said second means to return the web to within said range, and means acting in coordination with said indexing movement to disconnect said first means from said control means and to connect said second means with said control means.

16. A rollstand according to claim 13; wherein said rotary roll supports on said support members of each pair are constituted by a pair of chuck assemblies respectively carried by said support members of each pair and each having a rotatable shaft carrying the adjacent end of the respective roll and being axially movable relative to said support members; and
wherein said second means includes reversible power operated means for each chuck assembly acting on the respective shaft to effect axial movement of the said shaft relative to said support members, and said power operated means of the chuck assemblies supporting the unwinding roll in said expiring position are simultaneously operated to move the respective shafts in the same axial direction upon actuation of said second means by said actuating means.

17. A rollstand according to claim 16; wherein said actuating means includes a device operative to correct deviations of transverse register of the unwinding web relative to the web processing machine within a predetermined range, control means actuated by said device upon deviation of the transverse register of the web beyond said range to alternatively cause said first means to move said support members and said second means to move said shafts of the chuck assemblies in the sense for returning the web to within said range, and means acting in coordination with said indexing movement to disconnect said first means from said control means and to connect said second means with said control means.

18. A rollstand according to claim 16; wherein said support members dispose one of said pairs of chuck assemblies in a loading position for receiving the new roll when the unwinding roll is in said running position; and
further comprising means operable on said power operated means of the pair of chuck assemblies in loading position to dispose the new roll received thereby in a predetermined axial position between said support members, and means acting in coordination with said indexing movement to disconnect said first means from said actuating means, to connect said second means with said actuating means and to return said support members to a normal axial position at which the new roll is transversely registered with the web processing machine in the event that said support members are disposed away from such normal axial position.

19. A rollstand according to claim 16; wherein each pair of chuck assemblies has clamping means on said shafts thereof for clamping engagement with the web roll supported by the pair of chuck assemblies in response to urging of the related shafts axially toward each other; and
further comprising means causing said power operated means of at least one chuck assembly of each pair of chuck assemblies to urge the related shaft axially toward the shaft of the other chuck assembly of the same pair when the roll supported by said pair of chuck assemblies is moving toward said splicing position and disposed in said splicing, running and expiring positions, thereby to ensure continuous clamping engagement of each roll during the splicing of a web thereto and during the unwinding of the web from the roll.

20. A rollstand according to claim 13; wherein said rotary roll supports on said support members of each pair are constituted by a pair of chuck assemblies each having a rotatable shaft for carrying the adjacent end of the respective roll and being movable axially relative to said support members;
wherein each said shaft has clamping means thereon for clamping engagement with such roll end in response to displacement of the chuck assemblies of said pair axially toward each other, each web supply roll being wound on an open ended core, and said shaft of each chuck assembly having a projecting end portion movable axially into an adjacent end of the roll core; and
wherein said clamping means includes locking segments on said end portion of the shaft presenting outer surfaces to be seated against the inner surface of said core end, said locking segments and said end portion of the shaft having co-engaging surfaces at least some of which are inclined with respect to the axis of said shaft and operative to expand said segments radially into clamping engagement with said inner surface in response to movement of said end portion axially into said core end and relative to said segments.

21. A rollstand according to claim 20; wherein said locking segments have abutment surfaces thereon extending radially beyond said outer surfaces to bear axially against an end face of the roll core and hold said segments at definite axial locations in said core end as said end portion of the shaft is moved into said core end.

22. A rollstand according to claim 20; further comprising means preventing said indexing movement in the event of inadequate clamping engagement with the new roll of said clamping means of the chuck assemblies supporting the new roll.

23. A rollstand according to claim 16; wherein said shafts have clamping means thereon for clamping engagement with the web roll supported by each pair of chuck assemblies in response to relative axial movement in the direction towards each other of said shafts of the said pair, said power operated means of each chuck assembly includes a reversible, fluid pressure operated motor, bearing means having the related shaft journaled therein and being mounted in the adjacent support member for movement parallel to the axis of the said shaft and irreversible transmission means connecting said motor with said bearing means to permit said movement of the latter only upon operation of said motor, and said second means further includes means supplying fluid under pressure to said motor of one chuck assembly of each pair of chuck assemblies in the direction to urge the related shaft axially toward the shaft of the other chuck assembly of the same pair when the web roll supported by said pair of chuck assemblies is moving toward said splicing position and disposed in said splicing and running positions, means normally supplying fluid under pressure to the motors of both chuck assemblies of each pair in the directions to urge both shafts axially toward each other when the web roll supported by the said pair of chuck assemblies is in said expiring position, and means responsive to actuation of said second means by said actuating means to supply fluid under pressure to the motor of a selected one of the pair of chuck assemblies in said expiring position in the direction for moving the respective shaft axially away from the shaft of the other of said pair of chuck assemblies, whereby the motor of said other chuck assembly drives the respective shaft to follow the axial movement of the shaft of said one chuck assembly and thus maintain said clamping engagement with the roll.

24. A rollstand according to claim 23; further comprising means responsive to the pressure of said fluid supplied to said motor of one chuck assembly of each pair of chuck assemblies and preventing said indexing movement when said pressure is below a predetermined value.

25. A rollstand according to claim 13; wherein said support members of each pair are constituted by axially spaced radial portions of arms of a reel, which portions carry for rotation in the ends thereof shafts constituting parts of said rotary roll supports, said reel being rotatable about an axis parallel to said shafts for effecting said indexing movement and being displaceable in the direction of said axis for effecting said control of the sidelay when the unwinding roll is in said running position, and said shafts being axially movable relative to said arms for effecting said control of the sidelay when the unwinding roll is in said expiring position.

26. A rollstand according to claim 25; wherein said first means includes a first reversible motor, means driven by said first motor for displacing said reel in the direction of said axis, and first control means for said first motor actuatable by said actuating means when the unwinding roll is in said running position; and wherein said second means includes a second reversible motor for each of said shafts, means driven by said second motor to effect axial movement of the respective shaft relative to said arms, and control means for each said second motor actuatable by said actuating means when the respective shaft carries an unwinding roll in said expiring position.

27. A rollstand according to claim 26; further comprising detecting means sensing deviation of said reel from a normal axial position, and second control means for said first motor actuatable by said detecting means and being connected with said first motor means upon said indexing movement of the reel to cause said first motor means to return the reel to said normal axial position in the event that said detecting means senses a deviation of said reel from said normal axial position.

28. A rollstand according to claim 27; further comprising means controlling each said second motor when a new roll is initially disposed on the respective shaft so as to dispose said new roll at a predetermined axial position between said arms before said indexing movement to move the new roll to said splicing position, whereby the new roll arriving in said splicing position is transversely registered relative to the web processing machine and to the unwinding web to be spliced to its periphery.

29. A rollstand according to claim 13; wherein said actuating means includes two control relays alternatively actuated upon transverse deviation of the unwinding web at opposite sides of a predetermined sidelay, said first means includes a reversible electric motor operable to displace said support members as a unit axially of the rolls and energizing circuit means for said electric motor under the control of said control relays, said second means includes fluid pressure operated motors for displacing said rotary roll supports for each roll axially relative to said support members and means for supplying fluid under pressure to said fluid pressure operated motors including solenoid controlled valves and circuit means for selectively energizing said solenoid controlled valves under the control of said control relays, and further comprising selector relay means normally activating said circuit means for said electric motor and inactivating said circuit means for the solenoid controlled valves when the unwinding roll is in said running position, and means actuating said selector relay means upon said indexing movement to inactivate said circuit means for the electric motor and to activate said circuit means for the solenoid controlled valves.

30. A rollstand according to claim 5, in which said means for limiting the movement of said segments into the core are constituted by abutment surfaces on said segments extending radially beyond said outer surfaces to bear axially against an end face of the core and hold said segments at definite axial locations in said core end.

31. A rollstand according to claim 5, in which spring means urge said segments axially relative to said end portion of the shaft in the direction for retracting the segments radially, thereby to free said segments from said inner surface of the core in response to movement of said end portion axially in the direction out of said core end.

References Cited
UNITED STATES PATENTS

| | | | |
|---|---|---|---|
| 2,405,637 | 8/1946 | Behrems | 242—68.4 |
| 2,967,675 | 1/1961 | Markey | 242—57.1 |
| 3,309,036 | 3/1967 | Anderson | 242—58.3 |

LEONARD D. CHRISTIAN, *Primary Examiner.*